(12) United States Patent
Asai

(10) Patent No.: US 10,990,243 B2
(45) Date of Patent: *Apr. 27, 2021

(54) INFORMATION PROCESSING DEVICE AND RECORDING SYSTEM

(71) Applicant: BROTHER KOGYO KABUSHIKI KAISHA, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,170

(22) Filed: May 27, 2020

(65) Prior Publication Data

US 2020/0319772 A1 Oct. 8, 2020

Related U.S. Application Data

(63) Continuation of application No. 16/126,066, filed on Sep. 10, 2018, now Pat. No. 10,691,294, which is a
(Continued)

(30) Foreign Application Priority Data

Sep. 29, 2014 (JP) .................................. 2014-198117

(51) Int. Cl.
*G06F 3/0481* (2013.01)
*G06F 3/12* (2006.01)

(52) U.S. Cl.
CPC ............ *G06F 3/04817* (2013.01); *G06F 3/12* (2013.01); *G06F 3/1208* (2013.01);
(Continued)

(58) Field of Classification Search
CPC .......... G06F 3/04817; G06F 3/09; G06F 3/12; G06F 3/1256; G06F 3/1289
See application file for complete search history.

(56) References Cited

U.S. PATENT DOCUMENTS 7,619,764 B2 * 11/2009 Fukunaga ............. G06F 3/1288
358/1.15
8,276,068 B2 * 9/2012 Toda ..................... G06F 3/1288
715/274
(Continued)

FOREIGN PATENT DOCUMENTS

JP 2013-134618 A 7/2013
JP 2013-546032 A 12/2013

OTHER PUBLICATIONS

United States Official Action dated Oct. 5, 2017 received in related U.S. Appl. No. 14/867,246.
(Continued)

*Primary Examiner* — Phenuel S Salomon
(74) *Attorney, Agent, or Firm* — Scully, Scott, Murphy & Presser, PC

(57) ABSTRACT

In an information processing device, a storage unit stores format information and an option value to be used in a recording process. A communication unit is configured to perform wireless communication with a service providing device and an image recording device configured to perform the recording process. A control unit executes: receiving layout definition data including layout information representing a layout of a content image icon; displaying a layout image in which the content image icon is disposed according to the layout information; receiving content data from the service providing device; displaying a preview image representing a result of the recording process when the user's touch operation is received on a location of the content image icon; and transmitting recording instruction when the user's operation for instructing the image recording device to perform the recording process is received.

17 Claims, 17 Drawing Sheets

Related U.S. Application Data continuation of application No. 14/867,246, filed on Sep. 28, 2015, now Pat. No. 10,073,588.

(52) U.S. Cl.
CPC .......... *G06F 3/1256* (2013.01); *G06F 3/1289* (2013.01); *G06F 3/1292* (2013.01)

(56) References Cited

U.S. PATENT DOCUMENTS

| | | | | |
|---|---|---|---|---|
| 2003/0236713 | A1* | 12/2003 | Kuwabara | G06Q 10/087 705/26.1 |
| 2005/0286100 | A1* | 12/2005 | Uotani | G06F 3/1284 358/527 |
| 2006/0056873 | A1* | 3/2006 | Kimura | G03G 15/5087 399/81 |
| 2006/0192986 | A1* | 8/2006 | Suzuki | G06K 15/1851 358/1.13 |
| 2007/0211296 | A1* | 9/2007 | Toda | G06F 3/1212 358/1.18 |
| 2007/0263260 | A1* | 11/2007 | Ohta | H04N 1/00856 358/448 |
| 2009/0237725 | A1* | 9/2009 | Hamaguchi | H04N 1/00344 358/1.15 |
| 2009/0268239 | A1* | 10/2009 | Kawara | G06F 3/1288 358/1.15 |
| 2011/0292442 | A1* | 12/2011 | Nakagawa | H04N 1/00244 358/1.15 |
| 2012/0059811 | A1 | 3/2012 | Libin et al. | |
| 2012/0060098 | A1 | 3/2012 | Libin et al. | |
| 2012/0191728 | A1 | 7/2012 | Libin et al. | |
| 2013/0057891 | A1* | 3/2013 | Aoki | G06F 40/103 358/1.13 |

OTHER PUBLICATIONS

United States Notice of Allowance dated May 18, 2018 received in related U.S. Appl. No. 14/867,246.
United States Official Action dated Oct. 31, 2019 received in related U.S. Appl. No. 16/126,066.
United States Notice of Allowance dated Feb. 20, 2020 received in related U.S. Appl. No. 16/126,066.

* cited by examiner

FIG.2

| FORMAT INFORMATION | OPTION VALUE | | |
|---|---|---|---|
| | SHEET SIZE | SHEET TYPE | NUMBER OF COLORS |
| jpg | LETTER SIZE | GLOSSY PAPER | FULL-COLOR |
| pdf | A4 | PLAIN PAPER | 256-COLOR |
| txt | A4 | PLAIN PAPER | MONOCHROME |
| xml | A4 | PLAIN PAPER | 256-COLOR |
| ······ | ······ | ······ | ······ |

FIG.3A

<TEXT align=right>2014/9/9 Sunny </TEXT>

<TEXT> My family made a lunch. </TEXT>

<FILE src=www.server1.com/RECIPE.pdf />

<FILE src=www.server1.com/COOKING VIDEO.mpeg />

<IMAGE src=www.server1.com/pic.jpg align=center />

<TEXT> The lunch was delicious. </TEXT>

FIG.3B

LUNCH

FIG.15

```
<IMAGE src=www.server1.com/header.jpg/>
<TEXT align=right>2014/9/9 Sunny </TEXT>
<TEXT> My family made a lunch.  </TEXT>
<FILE src=www.server1.com/RECIPE.pdf />
<FILE src=www.server1.com/COOKING VIDEO.mpeg />
<IMAGE src=www.server1.com/pic.jpg align=center />
<TEXT> The lunch was delicious. </TEXT>
<IMAGE src=www.server1.com/footer.jpg/>
```

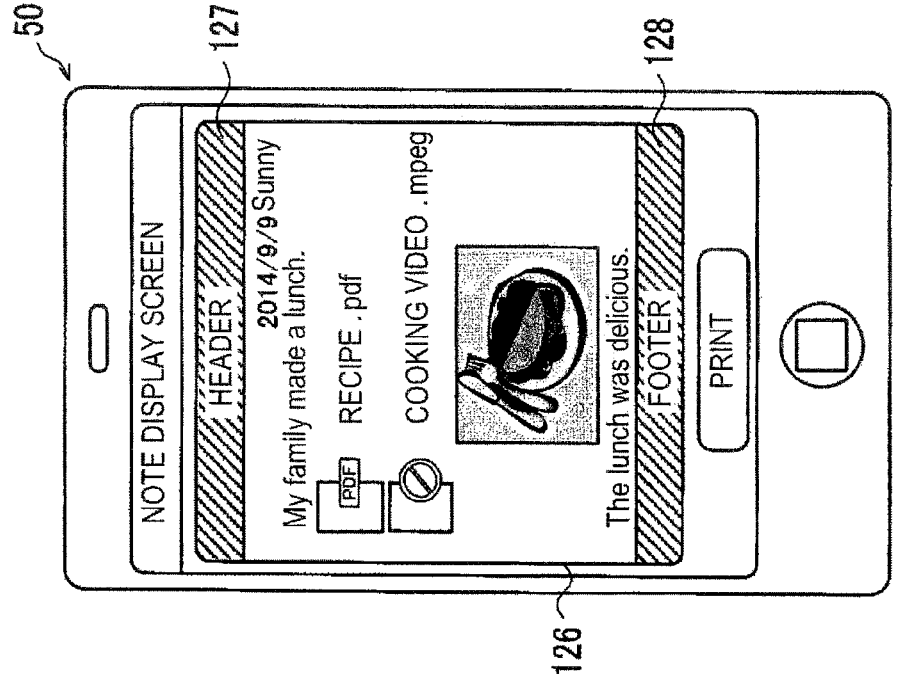
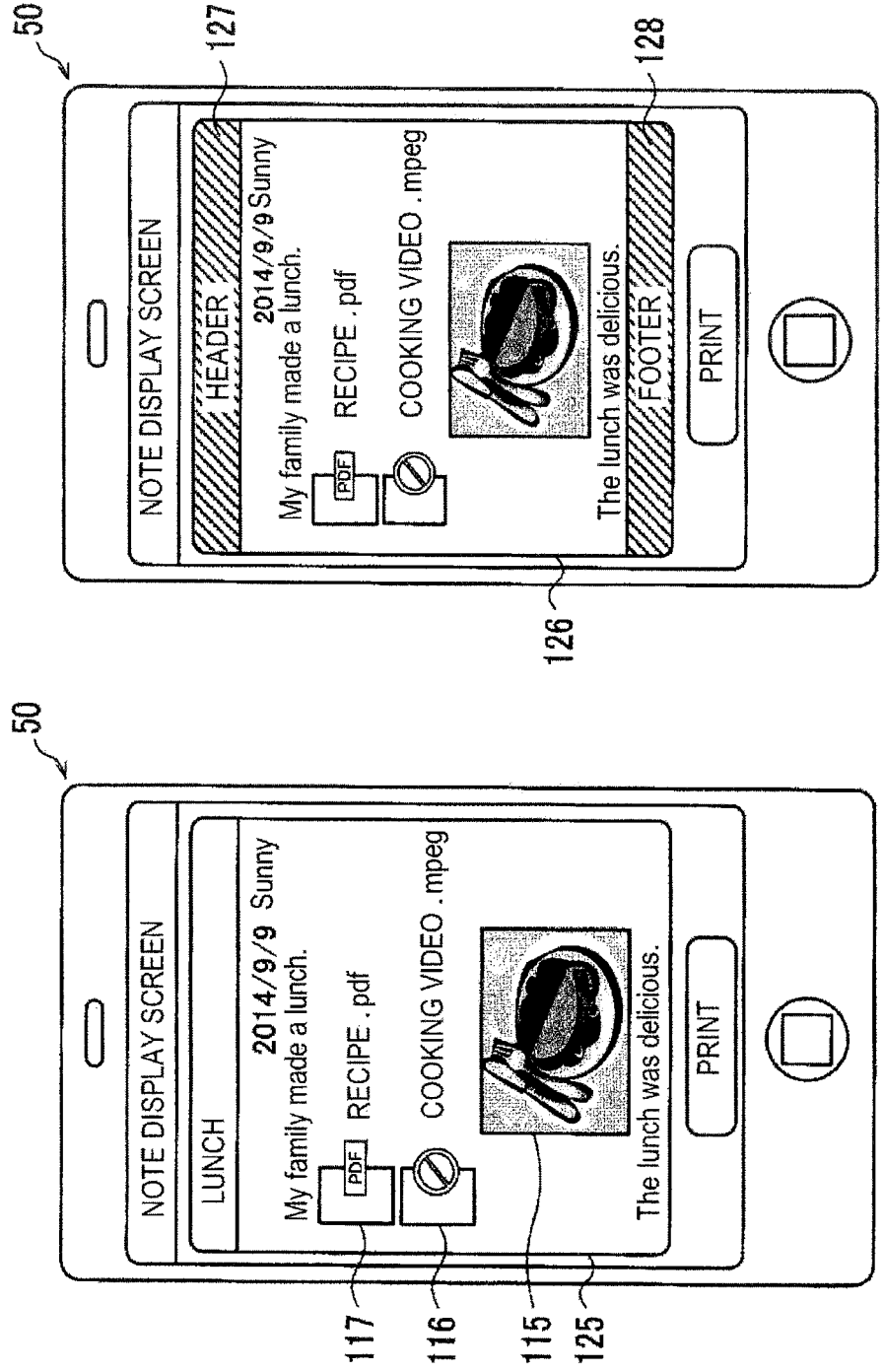

INFORMATION PROCESSING DEVICE AND RECORDING SYSTEM

CROSS REFERENCE TO RELATED APPLICATION

This application is continuation of U.S. Ser. No. 16/126,066 filed on Sep. 10, 2018, which is a continuation of U.S. Ser. No. 14/867,246, filed on Sep. 28, 2015, now U.S. Pat. No. 10,073,588 granted on Sep. 11, 2018, which are based upon and claim the benefit of priority of Japanese Patent Application No. 2014-198117 filed on Sep. 29, 2014, the contents of which are incorporated herein by reference in its entirety.

BACKGROUND

The present disclosure relates to a program capable of making an image recording device perform a recording process on content data acquired from a service providing device.

In the related art, there is known a program capable of making an image recording device record images represented by data acquired from service providing devices on sheets. For example, a program disclosed in a related art can make an image recording device perform a recording process of recording a character string representing a URL on a sheet if the character string representing the URL is included in a page acquired from a WEB server, and a recording process of recoding the page specified by the corresponding URL on a sheet.

However, a page can include not only character string data but also other data of various data formats, such as image data, document data, and spreadsheet data. Also, in one page, plural pieces of data of different data formats may exist together.

SUMMARY

An aspect of the present disclosure was made in view of the above described circumstances, and an object of the aspect of the present disclosure is to provide a program capable of performing a recording process with an appropriate option value according to the data format of content data included in layout definition data.

The aspect of the present disclosure provides the following configurations:

A non-transitory computer readable recording medium stores a computer readable instruction which can be executed by a computer which includes a display unit, a storage unit, an operation unit for receiving user's touch operations on a display screen of the display unit, and a communication unit, wherein the computer is configured to perform wireless communication through the communication unit and wherein the instruction when executed by the computer causes the computer to execute: a layout definition data receiving process of receiving layout definition data from the service providing device through the communication unit, the layout definition data including layout information representing a layout of a content image icon, wherein the content image icon is generated by and corresponds to content data, wherein the content data is stored in the service providing device; a layout displaying controlling process of controlling the display unit to display a layout image in which the content image icon is located according to the layout information; a content data receiving process of receiving content data from the service providing device through the communication unit; a first touch operation receiving process of receiving a user's touch operation on a location of the content image icon by the operation unit; a preview displaying controlling process of controlling the display unit to display a preview image, when the user's touch operation on a location of the content image icon is received according to the first touch operation receiving process, wherein the preview image represents an image recorded by a recording process to be performed in an image recording device, wherein in the recording process the image is recorded based on the content data according to an option value corresponding to data format of the content data, wherein the content data corresponds to the touched content image icon, wherein the option value is stored in the storage unit; an instruction operation receiving process of receiving, by the operation unit, a user's operation to perform the recording process; and a transmitting process of transmitting, to the image recording device through the communication unit, recording instruction for instructing the image recording device to perform the recording process when the user's operation is received according to the instruction operation receiving process.

An information processing device comprises: a display unit; a storage unit; an operation unit that receives user's touch operations on a display screen of the display unit; a communication unit; and a control unit. The storage unit stores format information representing a data format of content data which can be acquired from a service providing device, and an option value to be used in a recording process, in association with each other. The communication unit is configured to perform wireless communication with the service providing device and an image recording device configured to perform the recording process. The control unit is configured to execute: a layout definition data receiving process of receiving layout definition data from the service providing device through the communication unit, the layout definition data including layout information representing a layout of a content image icon, wherein the content image icon is generated by and corresponds to content data, wherein the content data is stored in the service providing device; a layout displaying controlling process of controlling the display unit to display a layout image in which the content image icon is located according to the layout information; a content data receiving process of receiving content data from the service providing device through the communication unit; a first touch operation receiving process of receiving a user's touch operation on a location of the content image icon by the operation unit; a preview displaying controlling process of controlling the display unit to display a preview image when the user's touch operation on a location of the content image icon is received according to the first touch operation receiving process, wherein the preview image represents an image recorded by a recording process to be performed in an image recording device, wherein in the recording process the image is recorded based on the content data according to an option value corresponding to data format of the content data, wherein the content data corresponds to the touched content image icon, wherein the option value is stored in the storage unit; an instruction operation receiving process of receiving, by the operation unit, a user's operation; and an outputting transmitting process of transmitting, to the image recording device through the communication unit, recording instruction for instructing the image recording device to perform the recording process when the user's operation is received according to the instruction operation receiving process.

A recording system comprises: an image recording device including: a recording unit configured to perform a recording process of recording images on sheets; a second communication unit; and a second control unit; and an information processing device including: a display unit including a display screen; a storage unit; an operation unit configured to receive user's touch operations on the display screen; a first communication unit configured to perform wireless communication with an image recording device and a service providing device; and a first control unit. The storage unit stores format information representing a data format of content data which can be acquired from the service providing device, and condition information representing condition for performing the recording process, in association with each other. The first control unit performs the following processes: a layout definition data receiving process of receiving layout definition data from the service providing device through the communication unit, the layout definition data including layout information representing a layout of a content image icon, wherein the content image icon is generated by and corresponds to content data, wherein the content data is stored in the service providing device; a layout displaying controlling process of controlling the display unit to display a layout image in which the content image icon is located according to the layout information; a content data receiving process of receiving content data from the service providing device through the communication unit; a first touch operation receiving process of receiving a user's touch operation on a location of the content image icon by the operation unit; a preview displaying controlling process of controlling the display unit to display a preview image representing a result of the recording process when the user's touch operation on a location of the content image icon is received according to the first touch operation receiving process, wherein the preview image represents an image recorded by a recording process to be performed in an image recording device, wherein in the recording process the image is recorded based on the content data according to an option value corresponding to data format of the content data, wherein the content data corresponds to the touched content image icon, wherein the option value is stored in the storage unit; an instruction operation receiving process of receiving, by the operation unit, a user's operation to perform the recording process; and a transmitting process of transmitting, to the image recording device through the communication unit, recording instruction for instructing the image recording device to perform the recording process when the user's operation is received according to the instruction operation receiving process. The second control unit is configured execute: a recording instruction information receiving process of receiving the recording instruction from the information processing device through the second communication unit; and a recording controlling process of controlling the recording unit to perform the recording process represented by the corresponding recording instruction when the recording instruction is received according to the recording instruction information receiving process.

BRIEF DESCRIPTION OF DRAWINGS

FIG. 2 shows examples of format information and option values stored in a data storage area 62B.

FIG. 3A shows an example of a layout definition data, and FIG. 3B shows an example of a theme information.

FIG. 15 is another example of the layout definition data.

FIGS. 16A and 16B show a preview screen including a layout image 125 and a preview screen including a layout image 126 as display examples of the display unit 53, respectively.

DESCRIPTION OF ILLUSTRATIVE EMBODIMENTS

Hereinafter, illustrative embodiments according to the present disclosure will be described with reference to appropriate drawings. Also, it goes without saying that the embodiments to be described below are just examples of the present disclosure and the embodiments of the present disclosure can be appropriately modified without changing the scope of the present invention.

Figure 1:
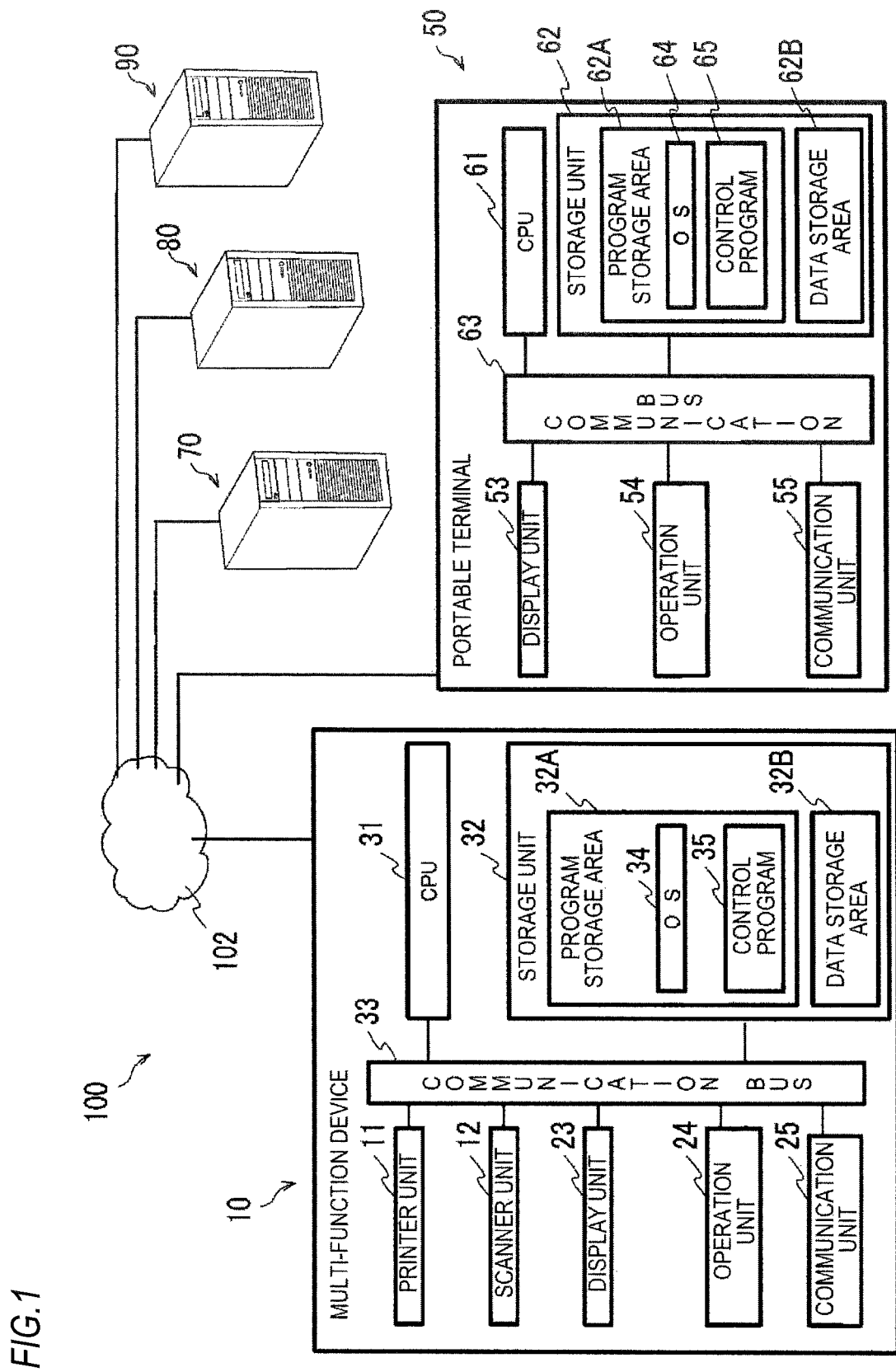
FIG. 1 is a block diagram of a recording system 100 according to an embodiment.

FIG. 1 is a schematic diagram of a recording system 100 according to an embodiment. The recording system 100 shown in FIG. 1 is composed of a multi-function device 10, a portable terminal 50, and service providing devices 70 and 80. Meanwhile, a service providing device 90 will be described below with respect to a second embodiment. The multi-function device 10, the portable terminal 50, and the service providing devices 70 and 80 can perform communication with one another through a communication network 102. Specific examples of the communication network 102 are not particularly limited, and may be, for example, the Internet, a mobile communication network, a wired LAN (an abbreviation for local area network), a wireless LAN, or a combination of them.

Multi-Function Device 10

As shown in FIG. 1, the multi-function device 10 manly includes a printer unit 11, a scanner unit 12, a display unit 23, an operation unit 24, a communication unit 25, a CPU 31, a storage unit 32, and a communication bus 33. These individual components constituting the multi-function device 10 are connected to one another through the communication bus 33. The multi-function device 10 is an example of an image recording device.

Printer Unit 11 and Scanner Unit 12

The printer unit 11 performs a recording process of recording images represented by image data on recording sheets which are examples of sheets. The recording mode of the printer unit 11 is not particularly limited, and can be a publicly known mode such as an inkjet mode or an electrophotographic mode. The scanner unit 12 performs a scanning process of reading images recorded on recording sheets, thereby generating image data. The multi-function device 10 may further have other functions, such as a FAX function of performing transmission and reception of facsimiles or a copying function of reading images recorded on recording sheets and recording the read images on other recording sheets.

Display Unit 23

The display unit 23 has a display screen which displays a variety of information. The specific configuration of the display unit 23 is not particularly limited, and may use, for example, an LCD (an abbreviation for liquid crystal display), an OELD (an abbreviation for organic electro-luminescence display), or the like.

Operation Unit 24

The operation unit 24 receives user's operations for selecting objects displayed on the display screen of the display unit 23. Specifically, the operation unit 24 has, for example, push buttons, and outputs various operation signals associated with pushed push buttons, to the CPU 31. Also, the operation unit 24 may have a membranous touch sensor superimposed on the display screen of the display unit 23. That is, the display unit 23 may be configured as a touch panel display. As the touch sensor, a publicly known type such as an electrostatic capacitance type or a resistive film type can be used.

The term "object" means an image which the user can select by operating the operation unit 24. As an example, the objects may be character strings displayed on the display unit 23. In this case, if the user pushes direction keys of the operation unit 24, one of the objects may be highlighted, and then if the user pushes a determination button of the operation unit 24, the highlighted object may be selected. As another example, in a case where the operation unit 24 is a touch panel, the objects may be icons, buttons, links, and the like displayed on the display unit 23, and an object displayed at a touched position may be selected.

Communication Unit 25

The communication unit 25 is an interface for performing communication with external devices through the communication network 102. That is, the multi-function device 10 outputs a variety of information to the portable terminal 50 or the service providing device 70 or 80 through the communication unit 25, and receives a variety of data or a variety of information from the portable terminal 50 or the service providing device 70 or 80 through the communication unit 25. A specific communication procedure of the communication unit 25 is not particularly limited, and can use, for example, Wi-Fi (a trademark of the Wi-Fi Alliance).

CPU 31

The CPU (an abbreviation for central processing unit) 31 controls the operation of the whole multi-function device 10. On the basis of a variety of information which are output from the operation unit 24, a variety of information acquired from external devices through the communication unit 25, and the like, the CPU 31 acquires various programs (to be described below) from the storage unit 32, and executes those programs. That is, the CPU 31 and the storage unit 32 constitute an example of a control unit.

Storage Unit 32

The storage unit 32 has a program storage area 32A and a data storage area 32B. In the program storage area 32A, an OS (an abbreviation for operating system) 34 and a control program 35 are stored. Also, the control program 35 may be a single program, or may be an aggregate of a plurality of programs. In the data storage area 32B, data or information necessary for executing the control program 35 are stored. The data storage area 32B stores format information and option values in association with each other as shown in FIG. 2.

The format information is information representing the data format of content data, text data, and layout definition data. In the example of FIG. 2, the format information represent "jpg" which is an example of the data format of image data, "pdf" which is an example of a data format different from the image format, "txt" which is an example of the data format of text data, and "xml" which is an example of the data format of layout definition data. However, specific examples of the format information are not limited thereto. Hereinafter, the data format of image data will also be referred to as the image format.

The option values are values representing execution conditions under which the multi-function device 10 should perform a recording process on data having a corresponding data format. In the example of FIG. 2, option values are "SHEET SIZE" option value (such as a letter size or A4), "SHEET TYPE" option value (such as glossy paper or plain paper), "COLOR" option value (such as full-color, 256-color, or monochrome), and so on. However, specific examples of the option values are not limited thereto, and may include a sheet direction, a resolution, a magnification, the number of copies, and so on.

In this specification, the term "data" and the term "information" are the same as each other in that they each represent a bit or a bit string which can be handled by a computer. However, when the computer handles "data," it is unnecessary for the computer to recognize the meanings of individual bits. In contrast, when the computer handles "information," an operation of the computer is diverged according to the meanings of individual bits. Also, a term "instruction" represents a control signal for prompting a device which is a transmission destination to perform a subsequent operation. An instruction may include "information" or may have characteristics as "information".

Further, even if "data" or the "information" is changed in format (for example, a text format, a binary format, a flag format, and so on) for each computer, as long as it can be recognized that the meaning of the changed data or information is identical to the meaning of the unchanged data or information, the changed data or information are handled as data or information identical to the unchanged data or information. For example, information indicating "two" may be saved in one computer as an ASCII code "0x32" which is text format information, and may be saved in another computer as a binary number "10" which is binary format information.

However, the term "data" and the term "information" are not strictly distinguished, and are permitted to be exceptionally handled. For example, data may be temporarily handled as information, or information may be temporarily handled as data. Further, while one is handled as data in one device, the one may be handled as information in another device. Furthermore, information may be taken out from among data, or data may be taken out from among information.

The storage unit 32 may be configured, for example, by a RAM (an abbreviation for random access memory), a ROM (an abbreviation for read only memory), an EEPROM (an abbreviation for electrically erasable programmable read-only memory), an HDD (an abbreviation for hard disk drive), a buffer which is included in the CPU 31, or a combination of them.

The storage unit 32 may be a computer-readable storage medium. The computer-readable storage medium is a non-transitory medium. Examples of the non-transitory medium include not only the above described examples but also other recording media such as a CD-ROM and a DVD-ROM. Also, the non-transitory medium is also a tangible medium. Meanwhile, an electric signal which carries a program which is downloaded from a server or the like on the Internet is a computer-readable signal medium which is one type of computer-readable medium, but is not included in non-transitory computer-readable storage media.

The programs stored in the program storage area 32A are executed by the CPU 31. However, in this specification, sometimes, the operation of each program will be described without mentioning the CPU 31. That is, in the following description, a description meaning that a program "A" performs a process "A" may mean that the CPU 31 performs the process "A" described in the program "A". This is common to the portable terminal 50 to be described below.

The OS 34 is a basic program which provides an API (an abbreviation for application programming interface) for controlling the printer unit 11, the scanner unit 12, the display unit 23, the operation unit 24, the communication unit 25, and so on which are hardware constituting the multi-function device 10. That is, each of the above described programs controls a corresponding piece of hardware by calling the API which is provided by the OS 34. However, in this specification, the operation of each program will be described without mentioning the OS 34. That is, in the following description, a description meaning that a program "B" controls hardware "C" may means that the program "B" controls the hardware "C" through the API of the OS 34. This is common to the portable terminal 50 to be described below.

Portable Terminal 50

As shown in FIG. 1, the portable terminal 50 mainly includes a display unit 53, an operation unit 54, a communication unit 55, a CPU 61, a storage unit 62, and a communication bus 63. The display unit 53, the operation unit 54, the communication unit 55, the CPU 61, the storage unit 62, and the communication bus 63 which are included in the portable terminal 50 are identical to the display unit 23, the operation unit 24, the communication unit 25, the CPU 31, the storage unit 32, and the communication bus 33 which are included in the multi-function device 10, and thus repeated descriptions thereof will not be made. The CPU 61 and the storage unit 62 is an example of a control unit.

The operation unit 54 of the portable terminal 50 includes a membranous touch sensor superimposed on the display screen of the display unit 53. Further, the operation unit 54 receives a user's touch operation on the display screen of the display unit 53. Furthermore, the operation unit 54 outputs location information representing the location on the display screen touched by a user. Location information can be expressed as coordinates (x, y) on an x-y plane where a direction toward the right is the positive side of the x axis and a downward direction is the positive side of the y axis. The operation unit 54 is an example of a receiving unit which receives user's operations.

In this specification, the term "touch" includes every operation of bringing input media into contact with the display screen. That is, a tap operation of detaching a touched input medium from the display screen in a predetermined time, a long touch operation of stopping a touched input medium on the display screen, a slide operation of sliding a touched input medium on the display screen, a flick operation of sliding a touched input medium with acceleration equal to or higher than a threshold value, a pinch-in operation of sliding two input media touched at different locations on the display screen toward each other, a pinch-out operation of sliding two input media touched at different locations on the display screen away from each other, and the like are touch examples. Also, the input media may be user's fingers, touch pens, etc.

The communication unit 55 performs communication with the multi-function device 10 or the service providing device 70 or 80 through a mobile communication network or a wireless LAN. In a program storage area 62A of the storage unit 62, an OS 64 and a control program 65 are stored. Specific examples of the portable terminal 50 are not limited to a smart phone, a mobile phone, a tablet terminal, and the like, and may be a PC (an abbreviation for personal computer) and so on. The portable terminal 50 is an example of an information processing device.

Service Providing Devices 70 and 80

The service providing devices 70 and 80 are devices for providing services to be used in the portable terminal 50. The service providing devices 70 and 80 exist on the Internet, and provide various services in response to requests from the portable terminal 50. The service providing device 70 is a device for providing a service, for example, "Evernote (a trademark of Evernote Corporation)". The service providing device 80 is a device for providing a storage service of storing data in file units, for example, "Dropbox (a trademark of DropBox, Inc.)" or "Google Drive (Google is a trademark of Google, Inc.)", or a general WEB server. The service providing device 70 is an example of a first service providing device or a specific service providing device, and the service providing device 80 is an example of a second service providing device.

The service providing device 70 stores layout definition data and theme information in association with each other as shown in FIGS. 3A and 3B. A layout definition data and a theme information corresponding to each other are uniquely identified, for example, by layout data identification information (hereinafter, referred to as a note ID). The number of layout definition data which can be stored in the service providing device 70 is not limited to one, and may be two or more. Also, the service providing device 70 stores first thumbnail image data corresponding to layout definition data, and thumbnail image data corresponding to content data having the image format.

Each layout definition data is a data defining the layout of a layout image. Each layout definition data includes layout information representing the layout of content images and texts. Content images are images representing content data. Texts are character strings represented by text data included in layout definition data. That is, layout images are generated by disposing content images and texts according to layout information. Theme information are information representing the themes of layout images which are defined by corresponding layout definition data. Layout definition data or layout images correspond to so-called notes, and themes correspond to so-called titles.

<TEXT> tag, <FILE> tag, and an <IMAGE> tag shown in FIG. 3A are examples of layout information. The <TEXT> tag is layout information representing text layouts. The <FILE> tags and the <IMAGE> tag are layout information representing a content image layout representing content data represented by a "src". The <IMAGE> tag corresponds to content data having the image format, and the <FILE> tag corresponds to content data having a format other than the image format. A file name at the end of a URL (an abbreviation for uniform resource locator) represented by a "src" is an example of an identification information for identifying a content data.

A language for describing layout definition data is not particularly limited, and layout definition data can be described, for example, in HTML (an abbreviation for HyperText Markup Language), XHTML (an abbreviation for Extensible HyperText Markup Language), or XML (an abbreviation for Extensible Markup Language). Also, theme information may be included in layout definition data, or may be stored independently from layout definition data.

Operation of Recording System 100

With reference to FIGS. 4 to 11B, a note printing process according to a first embodiment will be described. The note printing process is a process in which the portable terminal 50 having acquired a layout definition data from the service providing device 70 controls the multi-function device 10 such that the multi-function device performs a recording process of recording content, layout images, or texts represented by content data on sheets.

Figure 7B:
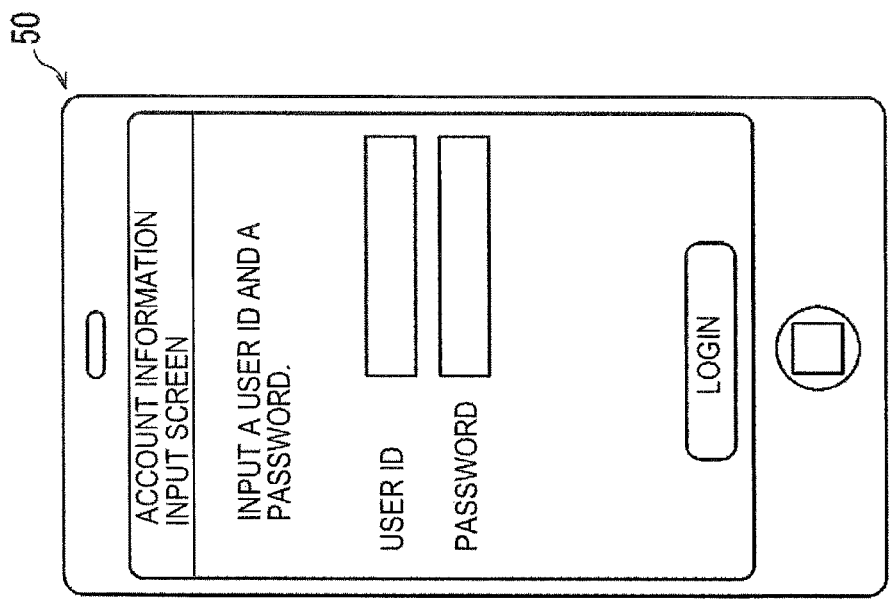
FIGS. 7A and 7B show a service selection screen and a layout information input screen as display examples of a display unit 53, respectively.
Figure 7A:
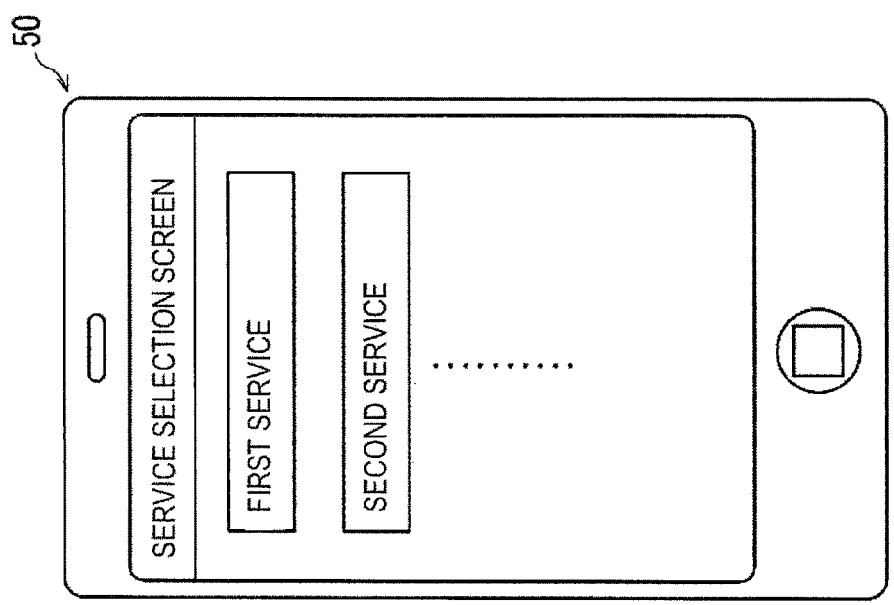

First, in STEP S11, the control program 65 of the portable terminal 50 controls the display unit 53 such that the display unit displays a service selection screen. FIG. 7A shows an example of the service selection screen. The service selection screen shown in FIG. 7A includes a "FIRST SERVICE" icon and a "SECOND SERVICE" icon. A first service is a service which the service providing device 70 provides, and a second service is a service which the service providing device 80 provides. However, it goes without saying that the number of service icons which can be included in the service selection screen is not limited to two. Thereafter, in STEP S12, the control program 65 stands by in a state where it can receive a user's operation for selecting one of the service icons included in the service selection screen through the operation unit 54. The processes of STEPS S11 and S12 are an example of a service selecting process.

If the operation unit 54 receives a user's tap operation on the location of the "FIRST SERVICE" icon ("YES" in STEP S12), in STEP S13, the control program 65 performs a token acquiring process. The token acquiring process is a process of acquiring a token representing that there is the authority to acquire data stored in the service providing device 70. The token is an example of authentication information. Details of the token acquiring process will be described with respect to a second embodiment. In the first embodiment, on the assumption that the token has been acquired, the following description will be made. STEP S13 is an example of an acquiring process.

Subsequently, in STEP S14, the control program 65 acquires a note list from the service providing device 70. For example, in STEP S14, the control program 65 receives note IDs, theme information, and first thumbnail image data corresponding to layout definition data and stored in the service providing device 70, from the service providing device 70 through the communication unit 55. The layout definition data, the theme information, and the first thumbnail image data may be stored in the service providing device 70 in association with one another.

The note IDs are information for identifying the layout definition data. The theme information are information representing the titles (hereinafter, also referred to as themes) of notes which are defined by the layout definition data. The theme information may be text data representing the titles of the notes. The first thumbnail image data is data representing first thumbnail images which are the thumbnails of the notes. Each first thumbnail image may be, for example, an image obtained by reducing the size of a representative image which is one of images which are included in a corresponding note. Alternatively, each thumbnail image may be an image obtained by decreasing the resolution of an original image.

More specifically, in STEP S14, the control program 65 transmits list request information including the token acquired in STEP S13, to the service providing device 70 through the communication unit 55. Then, the control program 65 receives theme information and first thumbnail image data as a response to the list request information. The process of STEP S14 is an example of a layout data list acquiring process.

Figure 5:
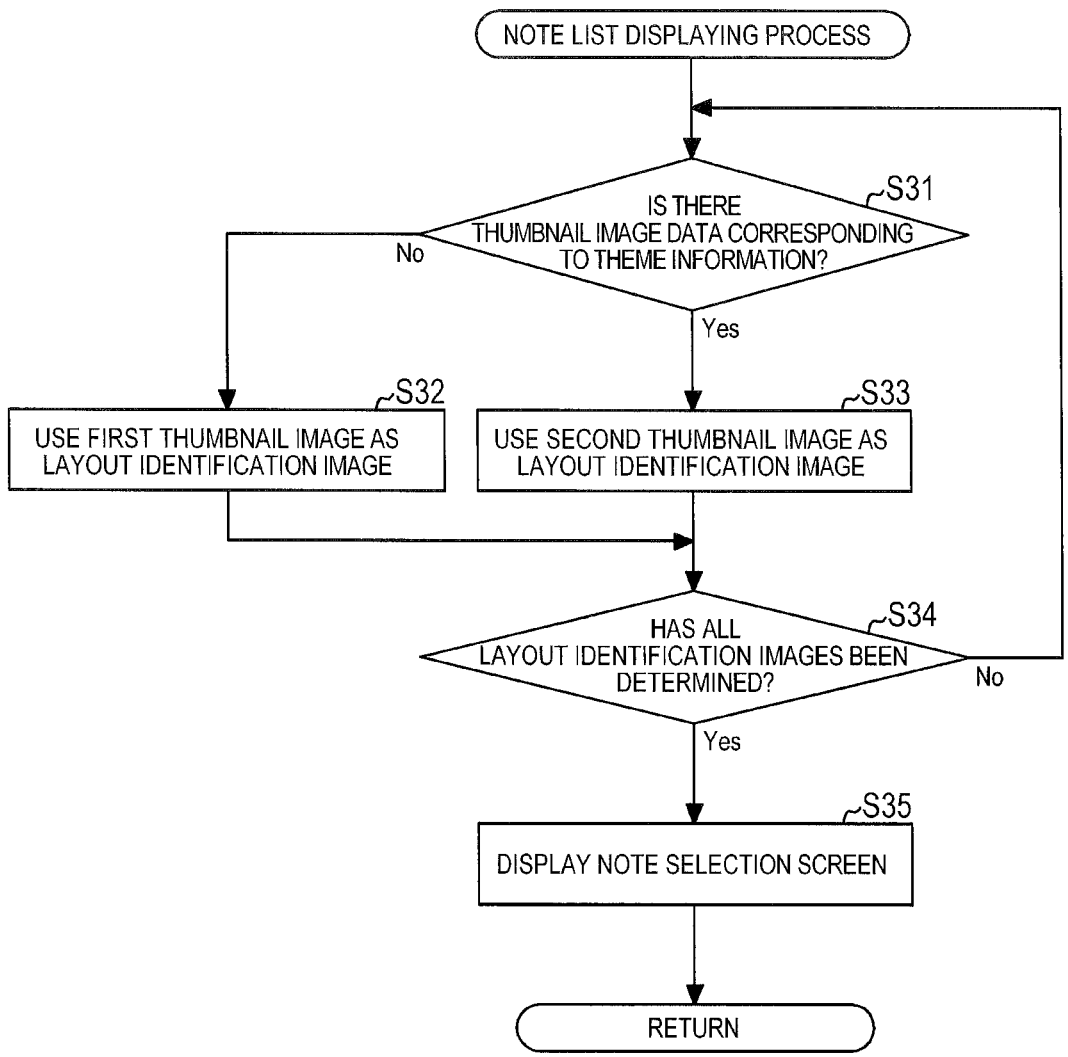
FIG. 5 is a flow chart of a note list displaying process.
Figure 6:
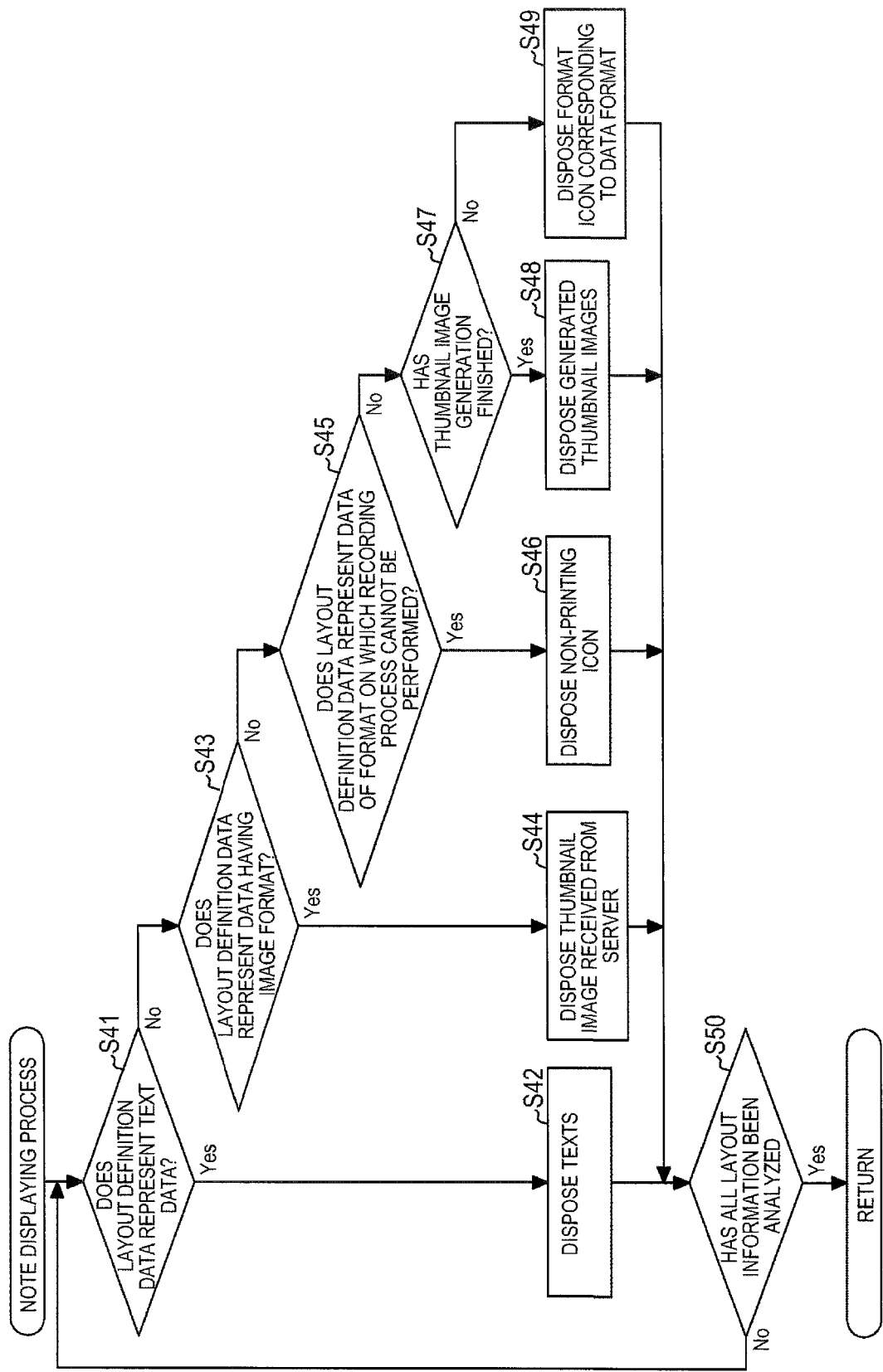
FIG. 6 is a flow chart of a note displaying process.

Subsequently, in STEP S15, the control program 65 performs a note list displaying process. The note list displaying process is a process of displaying a list of layout identification images corresponding to the layout definition data on the display unit 53, thereby enabling the user to select one of the layout definition data stored in the service providing device 70. With reference to FIG. 5, the note list displaying process will be described in detail.

First, in STEP S31, the control program 65 determines whether a second thumbnail image data corresponding to one of the theme information acquired in STEP S14 is stored in the data storage area 62B. If a corresponding second thumbnail image data is not stored in the data storage area 62B ("No" in STEP S31), in STEP S32, the control program 65 uses a first thumbnail image as a layout identification image corresponding to the corresponding theme information.

Meanwhile, if a corresponding second thumbnail image data is stored in the data storage area 62B ("Yes" in STEP S31), in STEP S33, the control program 65 uses the corresponding second thumbnail image data as a layout identification image corresponding to the corresponding theme information. Second thumbnail images are images which are represented by second thumbnail image data which are generated in STEP S19 to be described below. Each second thumbnail image may be, for example, an image which is obtained by reducing the size, resolution, or the like of a layout image representing all corresponding notes.

Figure 8B:
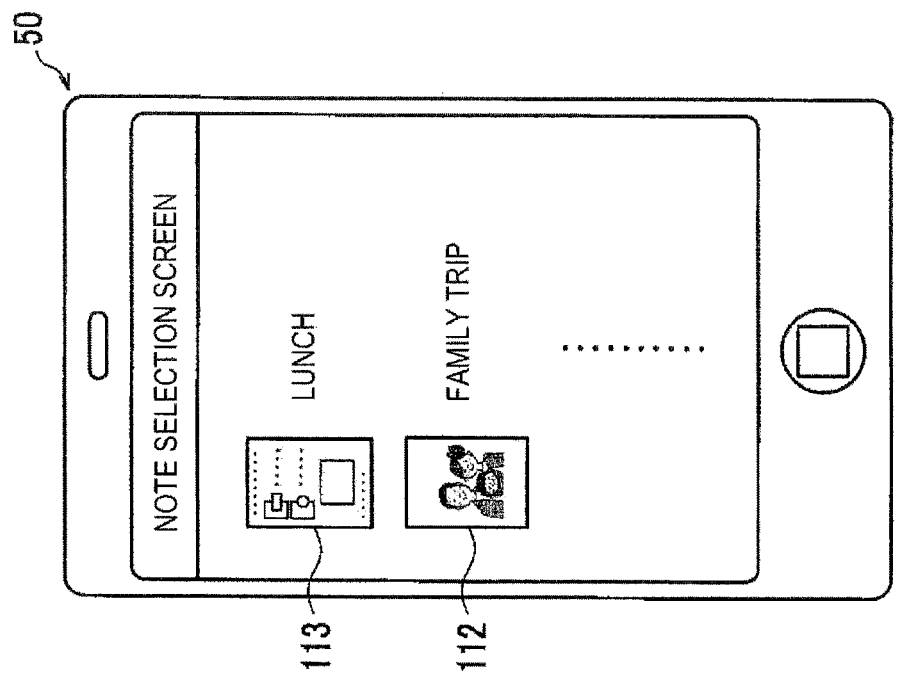
FIGS. 8A and 8B show an example including a first thumbnail image 111 and an example including a second thumbnail image 113 as display examples of a note selection screen of the display unit 53, respectively.
Figure 8A:
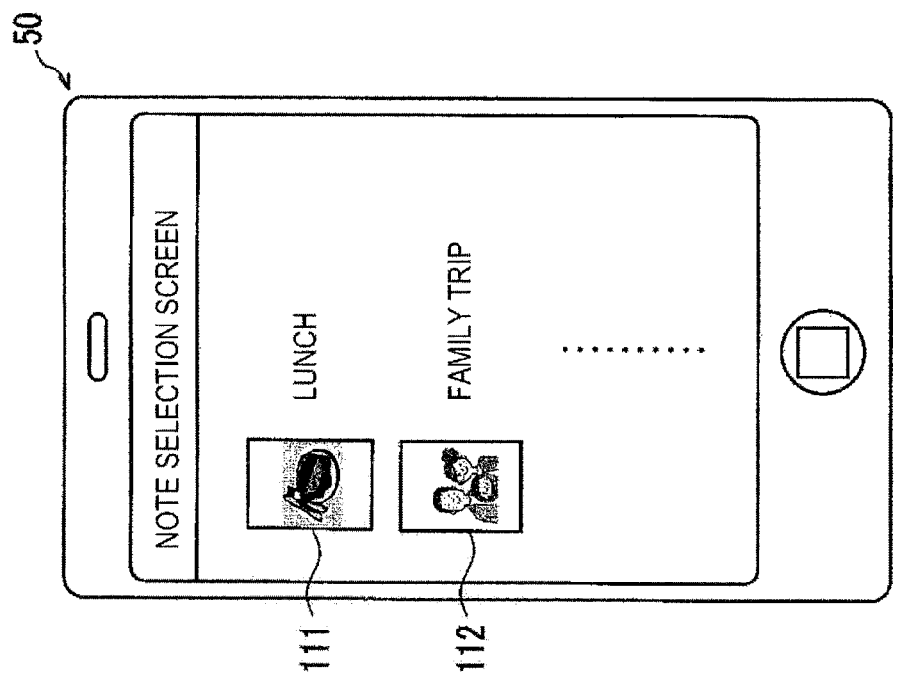

Until layout identification images corresponding to all theme information are determined ("No" in STEP S34), the control program 65 repeatedly performs the processes of STEPS S31 to S33). If all layout identification images are determined ("YES" in STEP S34), in STEP S35, the control program 65 controls the display unit 53 such that the display unit displays a note selection screen. FIGS. 8A and 8B show examples of the note selection screen. In the note selection screens shown in FIGS. 8A and 8B, lists of themes represented by theme information and layout identification images 111 to 113 corresponding to the theme information are displayed.

The layout identification images 111 and 112 shown in FIG. 8A are examples of first thumbnail images. The first thumbnail images may be representative images of notes. In other words, the first thumbnail images may be parts of the notes. Meanwhile, the layout identification image 113 shown in FIG. 8B is an example of second thumbnail images. Each second thumbnail image may be an image representing the whole of a note. However, a first thumbnail image and a second thumbnail image corresponding to a common theme information may be identical.

Returning to FIG. 4, in STEP S16, the control program 65 stands by in a state where it can receive a user's operation for selecting one of the layout identification images 111 to 113 included in the note selection screen through the operation unit 54. The processes of STEPS S15 and S16 are an example of a layout data selecting process. Also, in the note selection screen, in association with the layout identification images 111 to 113, in place of the theme information, other information such as texts included in layout definition data may be displayed. Also, the first thumbnail image data and the second thumbnail image data may be associated with information other than the theme information, for example, layout definition data or note IDs corresponding to the theme information. The theme information, the layout definition data, and the note IDs are associated with one another on a one to one basis. Therefore, it can be said that something corresponding to theme information indirectly corresponds to a layout definition data or a note ID.

If the operation unit 54 receives a user's tap operation on the location of one of the layout identification images 111 to 113 ("Yes" in STEP S16), in STEP S17, the control program 65 receives a layout definition data corresponding to the touched layout identification image, from the service providing device 70 through the communication unit 55. More specifically, the control program 65 transmits note request information including the token and a note ID, to the service providing device 70 through the communication unit 55. Then, the control program 65 may receive a layout definition data specified by the corresponding note ID, as a response to the note request information.

Also, in STEP S17, the control program 65 receives a thumbnail image data corresponding to a content data having the image format defined by the layout definition data, from the service providing device 70 through the communication unit 55. For example, the control program 65 can receive the thumbnail image data together with the content data by including an option for requesting transmission of the thumbnail image data in an HTTP request using the URL of the content data. The process of STEP S17 is an example of a layout data acquiring process.

Subsequently, in STEP S18, the control program 65 performs a note displaying process. The note displaying process is a process of controlling the display unit 53 such that the display unit displays a note display screen including a layout image, by analyzing the layout definition data acquired in STEP S17. More specifically, the note displaying process is a process of controlling the display unit 53 such that the display unit displays a layout image, by disposing texts represented by text data and content images represented by content data according to layout information. A procedure of controlling the display unit 53 such that the display unit displays a note selection screen shown in FIG. 9A or 9B according to the layout definition data of FIG. 3A will be described with reference to FIG. 6.

Figure 9A:
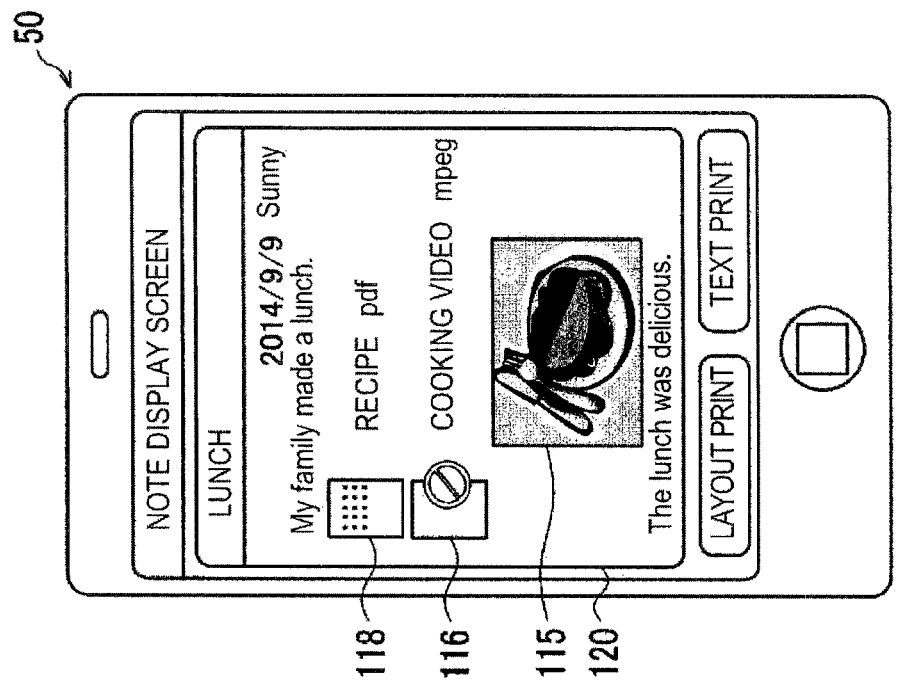
FIGS. 9A and 9B show an example including a format image 117 and an example including a thumbnail image 118 as display examples of a note display screen of the display unit 53, respectively.

First, if the layout definition data represents text data ("Yes" in STEP S41), in STEP S42, the control program 65 disposes texts represented by the corresponding text data, on a layout image, according to the layout information. As an example, the control program 65 disposes "2014/9/9 Sunny" represented by a <TEXT> tag of the first row of FIG. 3A, on the right side of a layout image 119 in a left-right direction as shown in FIG. 9A. As another example, the control program 65 disposes "My family made a lunch." and "The lunch was delicious." represented by <TEXT> tags of the second and sixth rows of FIG. 3A, on the left side of the layout image 119 in the left-right direction.

If the layout definition data represents content data having the image format ("Yes" in STEP S43), in STEP S44, the control program 65 disposes a thumbnail image represented by the thumbnail image data acquired in STEP S17, on the layout image according to the layout information. For example, the control program 65 disposes a thumbnail image 115 corresponding to the corresponding content data, as a content image corresponding to "pic.jpg" shown in the <IMAGE> tag of the fifth row of FIG. 3A, at the center of the layout image 119 in the left-right direction, as shown in FIG. 9A.

If the layout definition data represents content data having a data format which is different from the image format and on which the multi-function device 10 cannot perform a recording process ("Yes" in STEP S45), in STEP S46, the control program 65 disposes non-printing images stored in the data storage area 62B, and the identification information of the corresponding content data, on the layout image, according to the layout information. For example, the control program 65 disposes a non-printing image 116 and a character string "COOKING VIDEO.mpeg", as a content image corresponding to "COOKING VIDEO.mpeg" shown in a <FILE> tag of the fourth row of FIG. 3A, on the left side of the layout image 119 in the left-right direction, as shown in FIG. 9A. The non-printing image 116 is an example of a non-compliant image on which a recording process cannot be performed. A video format and a sound format are examples of a data format on which a recording process cannot be performed.

If the layout definition data represents content data having a data format which is different from the image format and on which the multi-function device 10 can perform a recording process ("No" in STEP S45), in STEP S47, the control program 65 determines whether any thumbnail image data corresponding to the corresponding content data is stored in the data storage area 62B. Also, a thumbnail image data corresponding to content data is generated in STEP S23 to be described below.

If any corresponding thumbnail image data is not stored in the data storage area 62B ("No" in STEP S47), in STEP S49, the control program 65 disposes a format image corresponding to the data format of the corresponding content data, and the identification information of the corresponding content data on the layout image according to the layout information. For example, the control program 65 disposes a format image 117 and a character string "RECIPE.pdf" as a content image corresponding to "RECIPE.pdf" shown in the <FILE> tag of the third row of FIG. 3A, on the left side of the layout image 119 in the left-right direction, as shown in FIG. 9A.

Figure 9B:
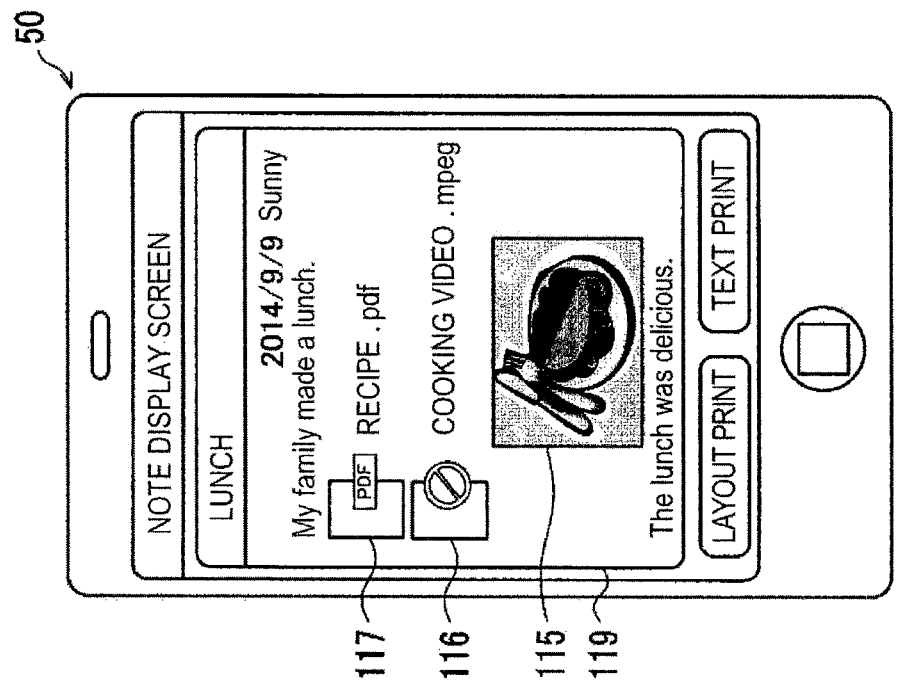

Meanwhile, if a corresponding thumbnail image data is stored in the data storage area 62B ("Yes" in STEP S47), in STEP S48, the control program 65 disposes a thumbnail image represented by the corresponding thumbnail image data, and the identification information of the corresponding content data, on the layout image according to the layout information. For example, the control program 65 disposes a thumbnail image 118 and a character string "RECIPE.pdf" as a content image corresponding to "RECIPE.pdf" shown in the <FILE> tag of the third row of FIG. 3A, on the left side of a layout image 120 in a left-right direction, as shown in FIG. 9B.

Until analyzing of the whole layout information included in the layout definition data finishes ("No" in STEP S50), the control program 65 repeatedly performs the processes of STEPS S41 to S49. Further, the control program 65 disposes a theme represented by a theme information corresponding to the layout definition data, at a predetermined location on the layout image 119 or 120. The theme "LUNCH" of the first embodiment is located at the upper left corner of the layout image 119 or 120. As a result, the note display screen shown in FIG. 9A or 9B is displayed on the display unit 53. Also, the control program 65 may generate a layout image data representing the whole of the layout image 119 or 120 according to the layout definition data, and control the display unit 53 such that the control unit displays the layout image 119 or 120 represented by the layout image data. The layout image data may have, for example, a JPEG format.

The note display screen shown in FIG. 9A includes the layout image 119, a "LAYOUT PRINT" icon, and a "TEXT PRINT" icon. The note display screen shown in FIG. 9B is different from the note display screen shown in FIG. 9A in that it includes the layout image 120, instead of the layout image 119. The layout image 120 is different from the layout image 119 in that it includes the thumbnail image 118, instead of the format image 117. Subsequently, in STEP S20, the control program 65 stands by in a state where it can receive a user's operation on the note display screen through the operation unit 54. The processes of STEPS S18 and S20 are examples of a layout displaying process.

In STEP S19, the control program 65 generates a second thumbnail image data corresponding to the layout image 119 or 120 displayed on the display unit 53 in STEP S18. For example, in STEP S19, specifically, the control program 65 generates a second thumbnail image data representing the layout image 119 or 120 using the layout definition data, and stores the corresponding second thumbnail image data in the data storage area 62B in association with the note ID, the theme information, and the like.

As an example, the control program 65 may generate a thumbnail image data by reducing the size, resolution or the like of the layout image data generated for displaying the note display screen, and store the corresponding thumbnail image data in the data storage area 62B. As another example, the control program 65 may store the layout image data as a thumbnail image data, in the data storage area 62B. However, in a case where a second thumbnail image data corresponding to the theme information is stored in the data storage area 62B, STEP S19 may be omitted. The process of STEP S19 is an example of a thumbnail generating process.

If the operation unit 54 receives a user's tap operation on the location of a content image included in the note display screen ("CONTENT IMAGE" in FIG. 20), in STEP S21, the control program 65 receives a content data corresponding to the content image, from the service providing device 70 through the communication unit 55. The process of STEP S21 is an example of a content data acquiring process.

For example, in STEP S21, the control program 65 transmits content request information including the token and content data identification information, to the service providing device 70 through the communication unit 55. Then, the control program 65 receives a content data identified by the corresponding identification information, as a response to the content request information. However, a content data acquisition timing is not limited to STEP S21. For example, in STEP S17, every content data defined by the layout definition data may be acquired.

Figure 10A:
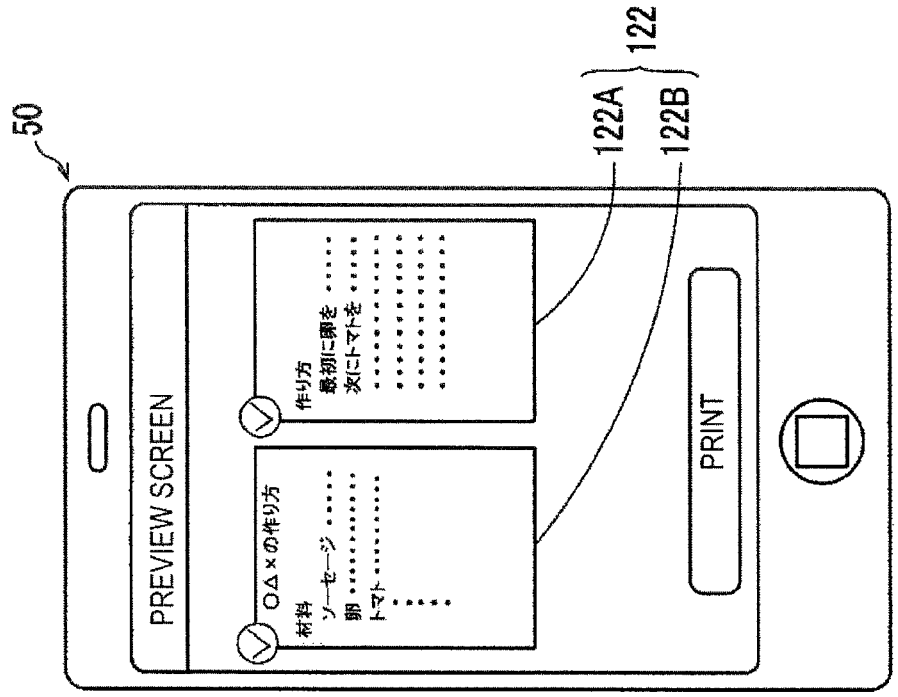
FIGS. 10A and 10B show an example including a preview image 121 of a content data having an image format and an example including a preview image 122 having a format different from the image format, as display examples of a preview screen of the display unit 53, respectively.
Figure 10B:
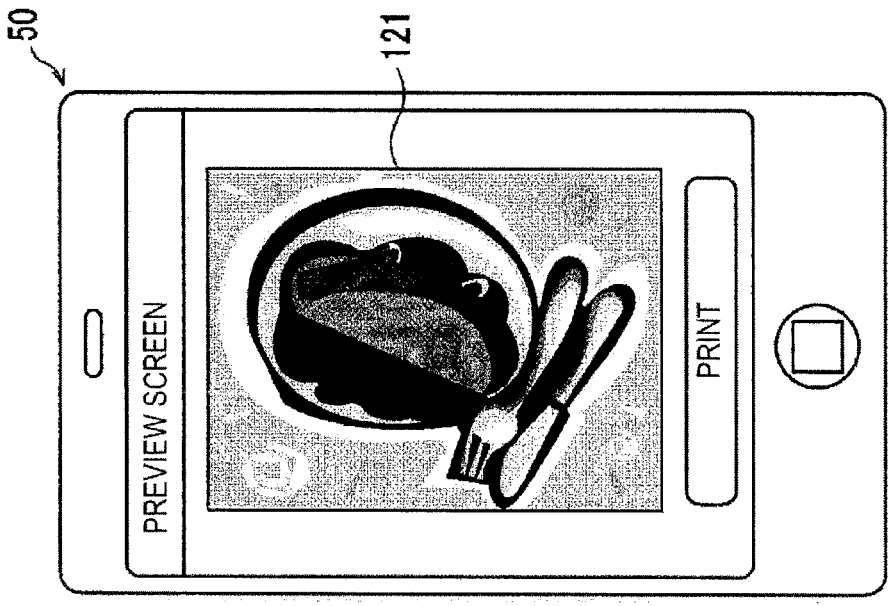

Subsequently, in STEP S22, the control program 65 controls the display unit 53 such that the display unit displays a preview screen of the content data acquired in STEP S21. FIGS. 10A and 10B are examples of the preview screen. The preview screen shown in FIG. 10A or 10B includes a preview image 121 or 122 representing a result which can be obtained by performing a recording process on the content data according to an option value corresponding to the content data, and a "PRINT" icon. Thereafter, in STEP S26, the control program 65 stands by in a state where it can receive a user's operation for selecting the "PRINT" icon through the operation unit 54. The process of STEP S22 is an example of a preview displaying process.

For example, in STEP S22, the control program 65 reflects an option value corresponding to the data format of the content data in the image represented by the content data, thereby generating a preview image data, and includes the preview image 121 or 122 represented by the preview image data, in the preview screen. Also, in STEP S27 (to be described below), the control program 65 may transmit the preview image data generated for displaying the preview screen, to the multi-function device 10 through the communication unit 55. The preview image data may have, for example, a JPEG format.

FIG. 10A is an example of a preview screen in a case where the operation unit 54 has received a user's tap operation on the location of the thumbnail image 115 shown in FIG. 9A or 9B. That is, the preview image 121 represents a result which can be obtained by performing a recording process on the content data "pic.jpg" acquired in STEP S21 according to an option value corresponding to its data format "jpg". The preview image 121 according to the present embodiment represents an image of a result which can be obtained by recording an image represented by the content data "pic.jpg" in full color on a glossy paper sheet having a letter size.

FIG. 10B is an example of a preview image in a case where the operation unit 54 has received a user's tap operation on the location of the format image 117 shown in FIG. 9A or the thumbnail image 118 shown in FIG. 9B. That is, the preview image 122 shows a result which can be obtained by performing a recording process on the content data "RECIPE.pdf" acquired in STEP S21 according to an option value corresponding to its data format "pdf". The preview image 122 according to the present embodiment represents an image of a result which can be obtained by converting an image represented by the content data "RECIPE.pdf" into a 256-color image, and recording the 256-color image on an A4 sheet.

Also, in a case where the content data is composed of a plurality of pages, in the preview screen, a list of a first preview image 112A representing the result of a recording process on a first page and a second preview image 112B representing the result of a recording process on a second page. Also, in a case where page break information representing the location of the boundary between the first page and the second page is included in the content data, the control program 65 may generate the first preview image 112A and the second preview image 112B according to the page break information. Meanwhile, in a case where page break information is not included in the content data, the control program 65 may determine the location of the boundary between the pages, for example, on the basis of the number of rows which can be included in a corresponding sheet size or one page.

In STEP S23, the control program 65 generates a thumbnail image data corresponding to the content data acquired in STEP S21, and stores the generated thumbnail image data in the data storage area 62B. A specific method of generating a thumbnail image data is not particularly limited. For example, in a case where the content data is composed of a plurality of pages as shown in FIG. 10B, a thumbnail image data representing the content of the first page may be generated. Meanwhile, generation of a thumbnail image data corresponding to a content data having the image format can be omitted. The process of STEP S23 is an example of the thumbnail generating process.

If the operation unit 54 receives a user's tap operation on the location of the "PRINT" icon ("Yes" in STEP S26), in STEP S27, the control program 65 transmits recording instruction information to the multi-function device 10 through the communication unit 55. The recording instruction information is information for instructing the multi-function device 10 to perform the recording process for which the result has been represented by the preview image 121 or 122. The process of STEP S27 is an example of an outputting process.

As an example, the recording instruction information includes print data for controlling the multi-function device 10 such that the multi-function device performs a recording process. The print data is data for performing a recording process on the content data acquired in STEP S21 according to an option value corresponding to the data format of the corresponding content data. In this case, the print data is generated by the control program 65. As another example, the recording instruction information includes the content data acquired in STEP S21, or a preview image data representing the preview image 121 or 122 displayed in STEP S22, together with an option value corresponding to the data format of the corresponding content data. In this case, the print data is generated by the control program 35 of the multi-function device 10.

Figure 11B:
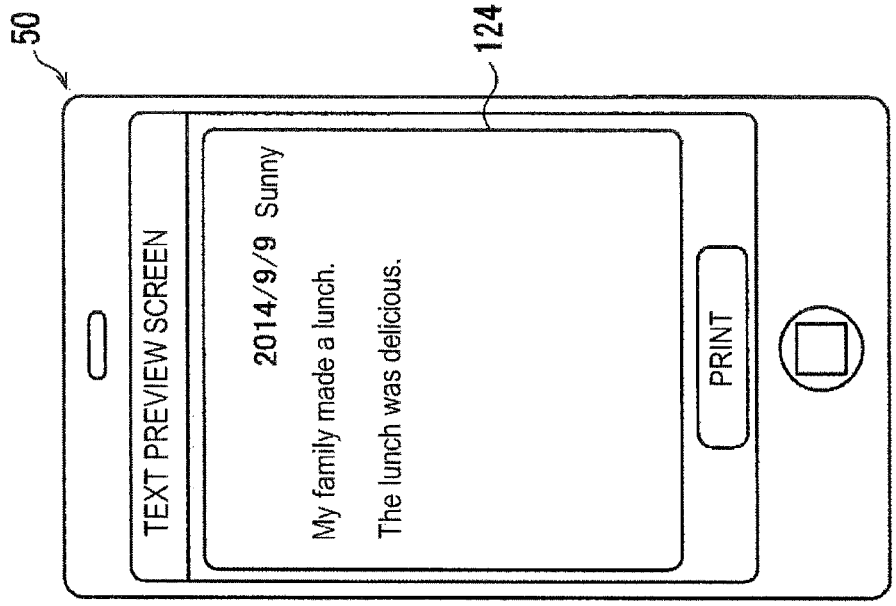
FIGS. 11A and 11B shows a note preview screen and a text preview screen as display examples of the display unit 53, respectively.
Figure 11A:
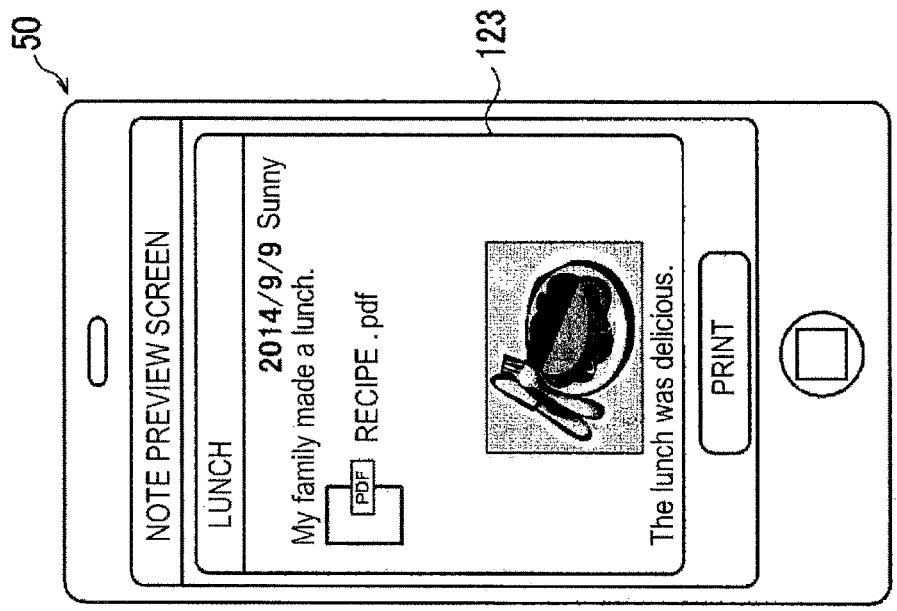

If the operation unit 54 receives a user's tap operation on the location of "LAYOUT PRINT" icon included in the note display screen ("LAYOUT PRINT" icon in STEP S20), in STEP S24, the control program 65 controls the display unit 53 such that the display unit displays a note preview screen. FIG. 11A is an example of a note preview screen in a case where the layout image 119 shown in FIG. 9A has been selected. The preview screen shown in FIG. 11A includes a preview image 123 and a "PRINT" icon.

The preview image 123 shows a result which can be obtained by performing a recording process on the layout image 119 according to an option value corresponding to the data format "xml" of the layout definition data. The option value corresponding to the data format of the layout definition data is an example of layout image option value. However, among content images included in the layout image 119, a content image corresponding to content data having a data format on which a recording process cannot be performed are not reflected in the preview image 123. That is, in the preview image 123, the non-printing image 116 and identification information corresponding to the content data "COOKING VIDEO.mpeg" are not included.

In other words, among the content images included in the layout image 119, only a content image corresponding to content data having a data format on which a recording process can be performed are reflected in the preview image 123. That is, in the preview image 123, texts represented by text data, the format image 117 and identification information corresponding to the content data "RECIPE.pdf", and the thumbnail image 115 and identification information corresponding to the content data "pic.jpg" are included. Also, in a preview screen which is displayed if the layout image 120 shown in FIG. 9B is selected, instead of the format image 117, the thumbnail image 118 is included.

If the operation unit 54 receives a user's tap operation on the location of the "TEXT PRINT" icon included in the note display screen ("TEXT PRINT" icon in STEP S20), in STEP S25, the control program 65 controls the display unit 53 such that the display unit displays a text preview screen. FIG. 11B is an example of the text preview screen. The text preview screen shown in FIG. 11B includes a preview image 124 and a "PRINT" icon.

The preview image 124 is an image representing a result which can be obtained by performing a recording process on texts extracted from the layout definition data according to an option value corresponding to the data format "txt" of text data. The option value corresponding to the data format of the text data is an example of text option value. Also, the texts extracted from the layout definition data may be located according to the layout information or may be located always on the left side.

Subsequently, if the operation unit 54 receives a user's tap operation on the location of the "PRINT" icon ("YES" in STEP S26), in STEP S27, the control program 65 transmits recording instruction information for instructing the multi-function device to perform the recording process for which the result has been represented by the preview image 123 or 124.

Meanwhile, if the control program 35 of the multi-function device 10 receives the recording instruction information from the portable terminal 50 through the communication unit 25, the control program 35 controls the printer unit 11 such that the printer unit performs the recording process represented by the corresponding recording instruction information. Also, as described above, data which is included in the recording instruction information may be the content data, or may be the preview image data representing the preview image, or may be the print data. That is, as long as the multi-function device 10 can perform the recording process according to the recording instruction information, specific examples of the data which is included in the recording instruction information are not particularly limited.

Meanwhile, if the operation unit 54 receives a user's tap operation on the location of the "SECOND SERVICE" icon ("No" in STEP S12), in STEP S28, the control program 65 transmits a request to the service providing device 80 by a method according to a corresponding service. For example, in a case where the service providing device 80 is a general WEB server, the control program 65 may transmit a general HTTP request to the service providing device 80 through the communication unit 55.

Effects of First Embodiment

According to the first embodiment, according to an option value corresponding to the data format of a selected content data, a recording process on the corresponding content data is performed. That is, with appropriate option value according to a data format, a recording process is performed. The control program 65 may receive a user's operation for changing an option value stored in the data storage area 62B, through the operation unit 54. In this case, with the option value desired by the user, a recording process is performed.

According to the first embodiment, in response to selection of a content data on the layout image 119 or 120 (that is, a touch on a content image), the preview image 121 or 122 of the corresponding content data is displayed on the display unit 53. Therefore, the user can easily select content to be a target of a recording process, in the layout image 119 or 120 laid out such that it can be seen easily, and can input a recording instruction after checking the result of the recording process in a preview screen.

According to the first embodiment, as a content image representing a content data having the image format, a thumbnail image is used. Therefore, the user can check the content of content data having the image format on layout images. According to the first embodiment, according to the propriety of performance of a recording process, a format image or a non-printing image is used as a content image representing a content data of a format other than the image format. Therefore, the user can recognize the propriety of performance of a recording process at a glance. Further, according to the first embodiment, a thumbnail image of a content data whose format is not the image format is generated for displaying a preview image. Thereafter, when a layout image is displayed, instead of a format image, the thumbnail image is displayed. Therefore, even with respect to content data having formats other than the image format, the user can check the content of the corresponding content data on the layout images. As a result, the user can more quickly select a desired content data.

A method of selecting a content image on a layout image is not limited to a tap operation, and may be, for example, a long touch operation or a double-tap operation. Check boxes may be provided for content images, respectively, such that a plurality of content data can be collectively selected by inputting check marks in corresponding check boxes. In this case, preview images of the selected content data are displayed as a list on a preview screen. Thereafter, if the "PRINT" icon is touched, a recording process on each content data is performed. In this way, it is possible to collectively perform a recording process on a plurality of content data included in a layout image. Therefore, it is possible to perform a recording process on a large number of pieces of content data by few operations According to the first embodiment, it is possible to record not only a single content data but also a layout image having content images laid out therein or texts included in a layout definition data, on sheets. Also, according to the first embodiment, content images representing content data on which a recording process cannot be performed are not reflected in a preview image, and are not recorded on recording sheets. However, it may be possible to enable the user to select whether to reflect each content data, representing a content data on which a recording process cannot be performed, in a preview image.

STEPS S23, S24, and S25 may be arbitrarily combined, and the corresponding combination may be performed. As an example, if the "LAYOUT PRINT" icon included in the note display screen is selected, STEPS S23 and S24 may be preformed. In this case, a recording sheet having a layout image recorded thereon, and recording sheets having content data recorded individually thereon are output from the printer unit 11. As another example, if the "TEXT PRINT" icon included in the note display screen is selected, STEPS S23 and S25 may be performed. In this case, recording sheets having only texts recorded thereon, and recording sheets having content data recorded individually thereon are output from the printer unit 11.

According to the first embodiment, a thumbnail image of a note displayed on the note display screen is generated. Thereafter, in the note display screen which is displayed, the corresponding thumbnail image is displayed as a layout identification image. Therefore, the user can confirm the content of each layout definition data. As a result, the user can quickly select a desired layout definition data.

Second Embodiment

Now, with reference to FIGS. 12 to 16B, a note printing process according to a second element will be described.

Also, components and processes identical to those of the first embodiment are denoted by the same reference symbols, and will not be described. Differences of the second embodiment from the first embodiment will be mainly described. A control program 65 which performs the note printing process according to the second embodiment is different from that of the first embodiment in that it uses a sharing function which is provided by the OS 64 and is activated by another application. Also, the note printing process according to the second embodiment is different from that of the first embodiment in that according to whether it is possible to acquire a token, layout definition data acquisition sources are switched.

Figure 12:
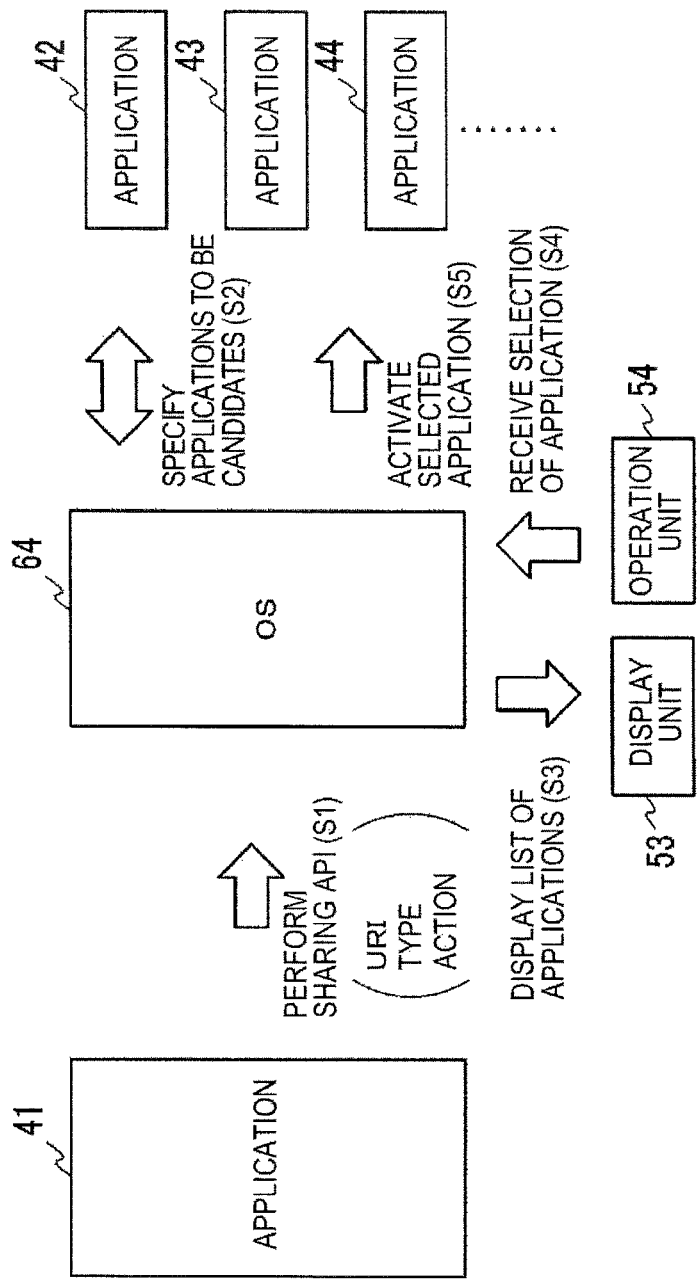
FIG. 12 is a view for explaining a sharing function which is implemented by a common API.

First, with reference to FIG. 12, the sharing function which is implemented by an API which is provided by the OS 64 of the portable terminal 50 will be described. The sharing function is a function of controlling a sharing destination application such that the sharing destination application processes data output from a sharing source application.

First, in STEP S1, a sharing source application 41 performs an API (hereinafter, referred to as the "sharing API") of the OS 64 for implementing the sharing function. By performing the sharing API, URI (an abbreviation for uniform resource identifier) information, type information, and action information are obtained as input arguments. The URI information is information representing the location of sharing data. The type information is information representing the data format of the shared data. The action information is information representing the type of processing (such as browsing, editing, transmitting, or printing) which is required to be performed in the sharing destination application.

Meanwhile, with respect to applications 42, 43, 44 . . . to be candidates for the sharing destination application, data formats which they can process, and the types of processing which they can perform are stated in advance in the OS 64. The OS 64 specifies applications which can perform processing represented by the action information on the sharing data having the data format represented by the type information, from among the applications 42, 43, 44 . . . in STEP S2, and controls the display unit 53 in STEP S3 such that the display unit displays a list of the specified applications. Then, in STEP S4, the OS 64 stands by in a state where it can receive a user's operation for selecting one of the applications displayed in the list through the operation unit 54.

Figure 13:
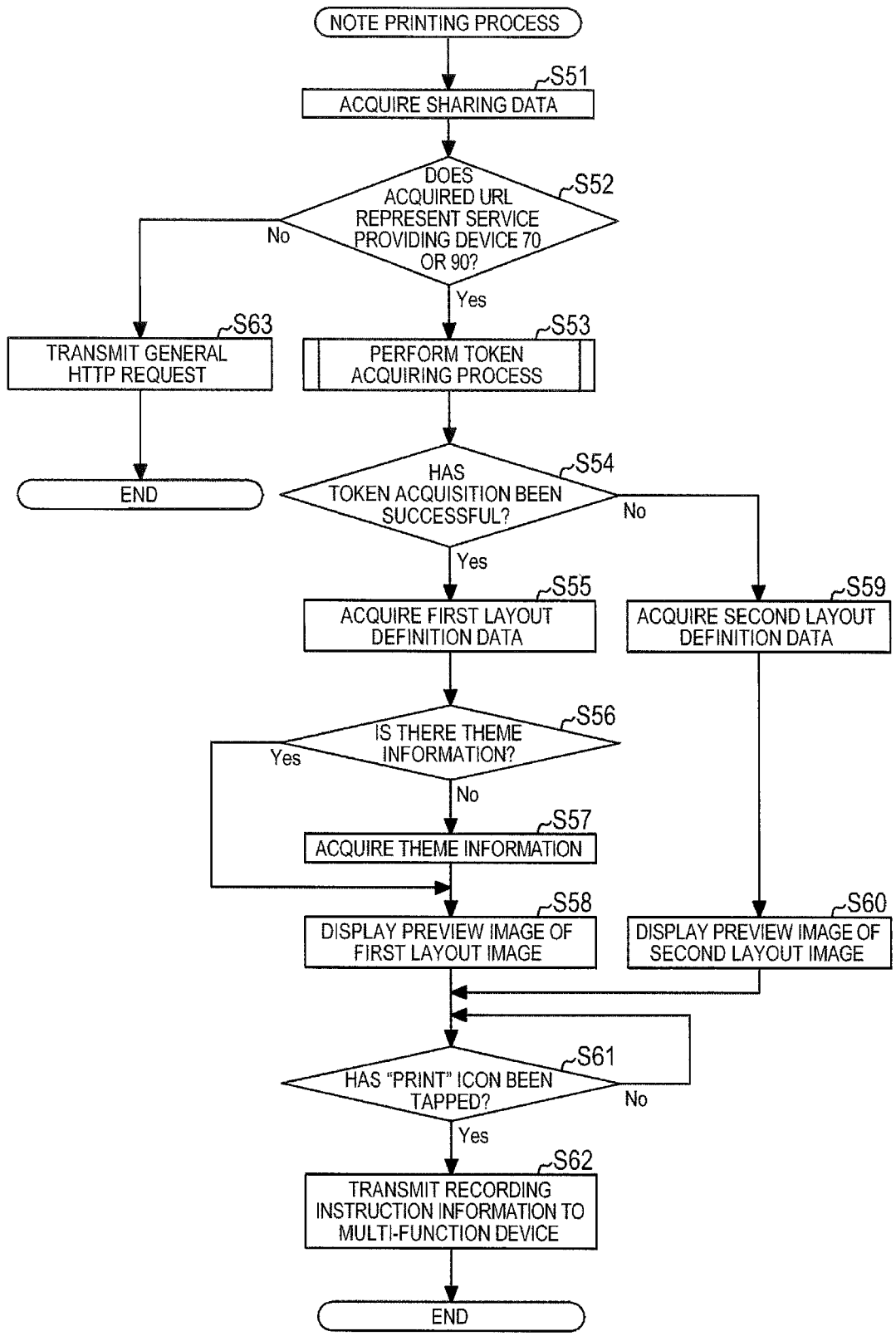
FIG. 13 is a flow chart illustrating a note printing process according to a second embodiment.

If the operation unit 54 receives a user's operation for selecting one of the applications displayed in the list in STEP S4, in STEP S5, the OS 64 activates the corresponding application using the URI information, the type information, and the action information as input arguments. On the assumption that in the second embodiment, in STEP S5, the control program 65 for performing a note printing process shown in FIG. 13 is active, the following processes will be described. Also, the OS 64 may notify the application 41 of information representing the application specified in STEP S2, and control the application 41 such that the application 41 performs the processes of STEPS S3 to S5.

In STEP S51, the control program 65 activated by the sharing function acquires the sharing data represented by a URI given as an input argument. The URI represents, for example, a file path for a text file stored in the data storage area 62B. Further, this text file can include a URL representing the location of a layout definition data stored in the service providing device 70, and a theme information corresponding to the corresponding layout definition data.

Furthermore, the URL representing the location of the layout definition data, for example, like "www.server1.com/shared/?id=001" includes a note ID "001" for identifying the corresponding layout definition data on the service providing device 70. The process of STEP S51 is an example of a location information acquiring process. Also, "www.server1.com" represents the service providing device 70. Meanwhile, "www.server2.com2" represents the service providing device 80.

The service providing device 70 according to the second embodiment stores a first layout definition data shown in FIG. 3A and a second layout definition data shown in FIG. 15 as layout definition data which are identified by the note ID "001". The second layout definition data is a data obtained by performing processing on the corresponding first layout definition data. The second layout definition data according to the second embodiment is obtained by adding an <IMAGE> tag, where "header.jpg" and "footer.jpg" has been set as an "src", to the first layout definition data.

Further, in the second embodiment, in addition to the service providing devices 70 and 80, the service providing device 90 for providing a service identical to that of the service providing device 70 exists. However, the service providing devices 70 and 90 independently provide the services to users in different areas. Therefore, a token of the service providing device 70 cannot be used to access to data stored in the service providing device 90. Also, "www.server2.com2" is a URL representing the service providing device 90.

Figure 14:
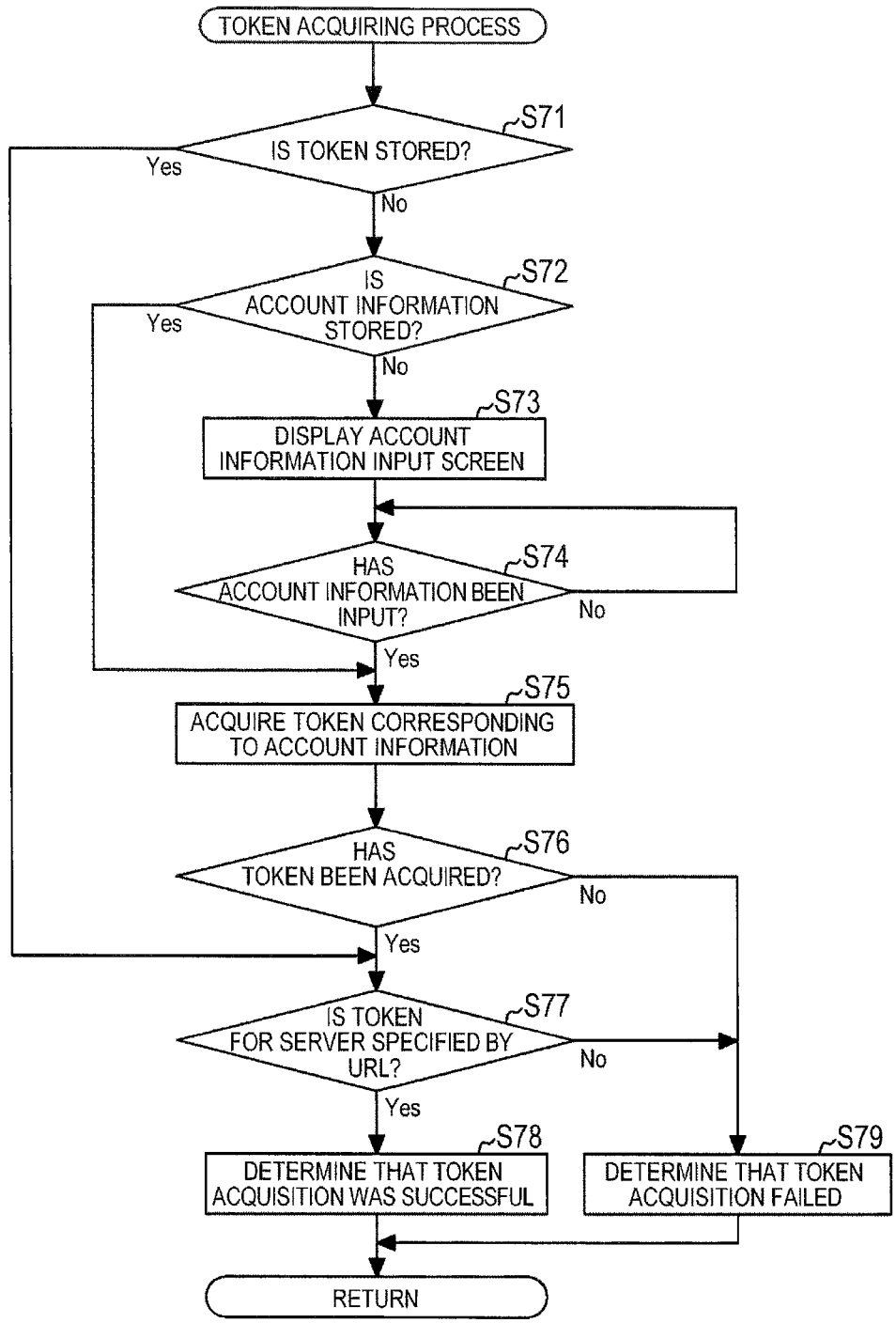
FIG. 14 is a flow chart of a token acquiring process.

If the URL acquired in STEP S51 represents the location of the service providing device 70 or 90 ("Yes" in STEP S52), in STEP S53, the control program 65 performs a token acquiring process. With reference to FIG. 14, details of the token acquiring process will be described. Also, if a character string representing a service providing device is included in the URL, the control program 65 determines that the corresponding URL represents the location of the corresponding service providing device. Specifically, in a case where the URL includes "www.server1.com" or "www.server2.com2", the control program 65 determines that the corresponding URL represents the location of the service providing device 70 or 90.

First, in STEP S71, the control program 65 determines whether the a token for accessing the service providing device represented by the URL acquired in STEP S51 is stored in the data storage area 62B. If a corresponding token is not stored in the data storage area 62B ("No" in STEP S71), in STEP S72, the control program 65 determines whether account information for acquiring a token is stored in the data storage area 62B. The processes of STEPS S71 and S72 are examples of a determining process.

If account information is not stored in the data storage area 62B ("No" in STEP S72, in STEP S73, the control program 65 controls the display unit 53 such that the display unit displays an account information input screen. FIG. 7B is an example of the account information input screen. The account information input screen shown in FIG. 7B includes a message "INPUT A USER ID AND A PASSWORD.", a text box for receiving a user ID input, a text box for receiving a password input, and a "LOGIN" icon. Then, in STEP S74, the control program 65 stands by in a state where it can receive a user's operation on the display unit 53 displaying the account information input screen through the operation unit 54. The processes of STEPS S73 and S74 are an example of an account information acquiring process.

If the operation unit 54 receives a user's tap operation on the location of the "LOGIN" icon ("Yes" in STEP S74), in STEP S75, the control program 65 acquires a token corresponding to the combination of a user ID and a password input in the text boxes, from the service providing device 70 or 90. The user ID and the password are examples of account information for acquiring a token. The process of STEP S75 is an example of an authentication information acquiring process. Also, a token acquisition source is not limited to the service providing device 70 or 90, and may be any other device which determines the validity of account information and issues a token corresponding to the service providing device 70 or 90. The token acquisition source will also be referred to as a token issuing device.

The OS 64 provides an API (hereinafter, referred to as the "token API") for requesting a token of the service providing device 70 or 90. The control program 65 can use the token API to transmit account information to the token issuing device and acquire a token as a response to the transmission of the account information. Also, the token issuing device issues a token corresponding to an area where the portable terminal 50 exists. That is, when STEP S75 is performed, in a case where the portable terminal 50 is in an area corresponding to the service providing device 70, a token corresponding to the service providing device 70 is acquired; whereas in a case where the portable terminal 50 is in an area corresponding to the service providing device 90, a token corresponding to the service providing device 90 is acquired.

For example, in STEP S75, the control program 65 transmits authentication request information including the user ID and the password to the token issuing device through the communication unit 55. Then, the control program 65 receives a token, as a response to the authentication request information, from the token issuing device through the communication unit 55. Also, in STEP S75, the control program 65 stores the user ID and the password acquired from the user through the account information input screen, and the token acquired from the token issuing device, in the data storage area 62B.

If a token is acquired from the token issuing device in STEP S75 ("Yes" in STEP S76), in STEP S77, the control program 65 determines whether the token is a token of the service providing device represented by the URL acquired in STEP S51. In other words, in STEP S77, the control program 65 determines whether the service providing device 70 or 90 whose location is represented by the URL acquired in STEP S51 coincides with the service providing device 70 or 90 which can be accessed to acquire data by the token acquired in STEP S75.

If the acquired token is a toke of the service providing device represented by the URL acquired in STEP S51 ("Yes" in STEP S77), in STEP S78, the control program 65 determines that token acquisition was successful, and finishes the token acquiring process. Meanwhile, if the acquired token is not a token of the service providing device represented by the URL acquired in STEP S51 ("No" in STEP S77), in STEP S79, the control program 65 determines that token acquisition failed and finishes the token acquiring process. Also, if a token cannot be acquired in STEP S75 ("No" in STEP S76), in STEP S79, the control program 65 determines that token acquisition failed and finishes the token acquiring process.

If account information is stored in the data storage area 62B ("Yes" in STEP S72), the control program 65 skips the processes of STEPS S73 and S74, and performs the processes of STEP S75 and the subsequent steps using the stored account information. Further, if a token is stored in the data storage area 62B ("Yes" in STEP S71), the control program 65 skips the processes of STEPS S72 to S76, and performs the processes of STEP S77 and the subsequent steps with respect to the stored token.

Returning to FIG. 13, if token acquisition is successful in STEP S53 ("Yes" in STEP S54), in STEP S55, the control program 65 acquires a first layout definition data. For example, the control program 65 transmits note request information including the token and the note ID "001" included in the URL acquired in STEP S51, to the service providing device 70 through the communication unit 55. Then, the control program 65 receives a first layout information identified by the note ID "001", as a response to the note request information, from the service providing device 70 through the communication unit 55. The process of STEP S55 is an example of a first acquiring process. The first layout definition data is an example of first data.

Subsequently, in STEP S56, the control program 65 determines whether a description of a theme information corresponding to the note ID "001" is included in a text file which was referred to in STEP S51. If a description of a theme information is not included in the corresponding text file ("No" in STEP S56), in STEP S57, the control program 65 acquires a corresponding theme information from the service providing device 70. Meanwhile, if a description of a theme information is included in the corresponding text file ("Yes" in STEP S56), the control program 65 skips the process of STEP S57.

For example, in STEP S57, the control program 65 transmits theme request information including the note ID "001" to the service providing device 70 through the communication unit 55. Then, the control program 65 receives a theme information corresponding to the note ID "001", as a response to the theme request information, from the service providing device 70 through the communication unit 55. The process of STEP S57 is an example of a theme information acquiring process.

Subsequently, in STEP S58, the control program 65 controls the display unit 53 such that the display unit displays a preview screen shown in FIG. 16A. The preview screen shown in FIG. 16A includes the layout image 125 and a "PRINT" icon. The layout image 125 is generated by analyzing the first layout definition data acquired in STEP S55. Also, at the upper left corner of the layout image 125, a theme represented by the theme information is located. The layout image 125 is an example of a first layout image. The process of STEP S58 is an example of the preview displaying process.

If token acquisition fails in STEP S53 ("No" in STEP S54), in STEP S59, the control program 65 acquires a second layout definition data from a location represented by the URL acquired in STEP S51. For example, in STEP S59, the control program 65 can acquire the second layout definition data by a general HTTP request. Also, a second layout definition data acquisition source may be the service providing device 70, or may be a service providing device different from the service providing device 70. STEP S59 is an example of a second acquiring process. The second layout definition data is an example of second data.

Subsequently, in STEP S60, the control program 65 controls the display unit 53 such that the display unit displays a preview screen shown in FIG. 16B. The preview screen shown in FIG. 16B includes the layout image 126 and a "PRINT" icon. The layout image 126 is generated by analyzing the second layout definition data acquired in STEP S59. The layout image 126 is an example of a second layout image. The process of STEP S60 is another example of the preview displaying process.

The layout image 126 is different from the layout image 125 in that it includes a content image 127 corresponding to content data "Header.jpg" and a content image 128 corresponding to content data "footer.jpg". As a result, a part of the layout image 126 corresponding to a note is smaller than that of the layout image 125. Also, the layout image 126 includes images corresponding to the thumbnail image 115, the non-printing image 116, and the format image 117 included in the layout image 125. However, even if the operation unit 54 receives a user's tap operation on any one of those images, a process of acquiring a content data corresponding to the corresponding image is not performed. Further, the layout image 126 does not include a theme.

Subsequently, in STEP S61, the control program 65 stands by in a state where it can receive a user's operation on the preview screen through the operation unit 54. If the operation unit 54 receives a user's tap operation on the location of the "PRINT" icon ("Yes" in STEP S61), in STEP S62, the control program 65 transmits recording instruction information to the multi-function device 10 through the communication unit 55. The recording instruction information which is transmitted in STEP S62 is information for instructing the multi-function device 10 to perform a recording process on the layout image 125 or 126. The process of STEP S62 is an example of the outputting process.

Meanwhile, if the URL acquired in STEP S51 represents the location of the service providing device 80 different from the service providing devices 70 and 90 ("No" in STEP S52), in STEP S63, the control program 65 transmits a request to the service providing device 80, using the URL, without performing the token acquiring process. Specifically, the control program 65 may transmit a HTTP Get request using the URL. Then, the control program 65 performs processing on data acquired as a response to the corresponding request.

As an example, if the control program 65 acquires a layout definition data as a response to the HTTP Get request, it controls the display unit 53 such that the display unit displays a layout image acquired by analyzing the corresponding layout definition data. Also, for example, even in STEP S59, by the same method (for example, an HTTP Get request) as that in STEP S63, the control program 65 may acquire a second layout definition data from the service providing device 90. That is, in STEPS S59 and S60 and STEP S63, the control program 65 may perform processing in the same procedure.

Meanwhile, if a data which is not a layout definition data is acquired as a response to the HTTP Get request, the control program 65 performs processing according to the corresponding data. For example, in a case where the URL acquired in STEP S51 represents a content data of the service providing device 80, in STEP S63, the control program 65 may acquire the content data represented by the corresponding URL from the service providing device 80 and control the display unit 53 such that the display unit displays a content image represented by the corresponding content data.

Effects of Second Embodiment

According to the second embodiment, in a case where a token is stored in the data storage area 62B, the first acquiring process (STEP S55) is performed, whereby the layout image 125 which does not include the content images 127 and 128 can be recorded on a sheet. Meanwhile, in a case where a token is not stored in the data storage area 62B, the second acquiring process (STEP S59) is performed, whereby the layout image 126 including the content images 127 and 128 can be recorded on a sheet. As a result, according to whether there is a token, it is possible to record an appropriate layout image on a sheet.

The layout image 126 according to the second embodiment is obtained by including the content images 127 and 128 in the layout image 125. However, layout image processing is not limited to content image addition, and may include image processing including changing of the resolution or number of colors of a layout image and the like. Also, data which are acquired in the first acquiring process and the second acquiring process are not limited to layout definition data. For example, in the second acquiring process, the control program 65 may acquire a layout image data representing the layout image 126.

According to the token acquiring process related to the second embodiment, in a case where a token is not stored in the data storage area 62B, a token is acquired using account information, and in a case where account information is not stored in the data storage area 62B, account information is acquired from the user. Therefore, a possibility that a recording process on the layout image 125 which does not include the content images 127 and 128 will be performed increases.

In the token acquiring process according to the second embodiment, a token of a service providing device corresponding to an area where the portable terminal 50 exists is issued. Therefore, in a case where a token is stored in the data storage area 62B ("No" in STEP S71), if the service providing device 70 or 90 represented by the URL acquired in STEP S51 is different from the service providing device 70 or 90 corresponding to the area where the portable terminal 50 exists, the control program 65 skips STEPS S72 to S76, and proceeds to STEP S79.

The location where the portable terminal 50 exists is specified by, for example, location information which the portable terminal 50 has received from a GPS (an abbreviation for global position system), or information of a communication device connected to the portable terminal 50. As an example, in a case where the portable terminal 50 is connected to a Wi-Fi network, the control program 65 may specify the location of the portable terminal 50 according to a global IP address set in a broadband router which is an example of the communication device. As another example, in a case where the portable terminal 50 is connected to a mobile communication network, the control program 65 may specify the location of the portable terminal 50 according to information on the location of the nearest base station.

The second acquiring process may be performed in a case where the first acquiring process fails. Failure of the first acquiring process is, for example, a case where it is impossible to acquire a first layout definition data even though note request information has been transmitted. In the case where it is impossible to acquire a first layout definition data is, for example, a case where first data has been already deleted from the service providing device 70, a case where a token is invalid, or the like. As a result, in the case where it is impossible to acquire a first layout definition data, it is possible to prevent a recording process from becoming totally impossible. Further, the second acquiring process may be performed in a case where a description of a theme information is not included in the text data referred to in STEP S51 ("No" in STEP S56).

Figure 17:
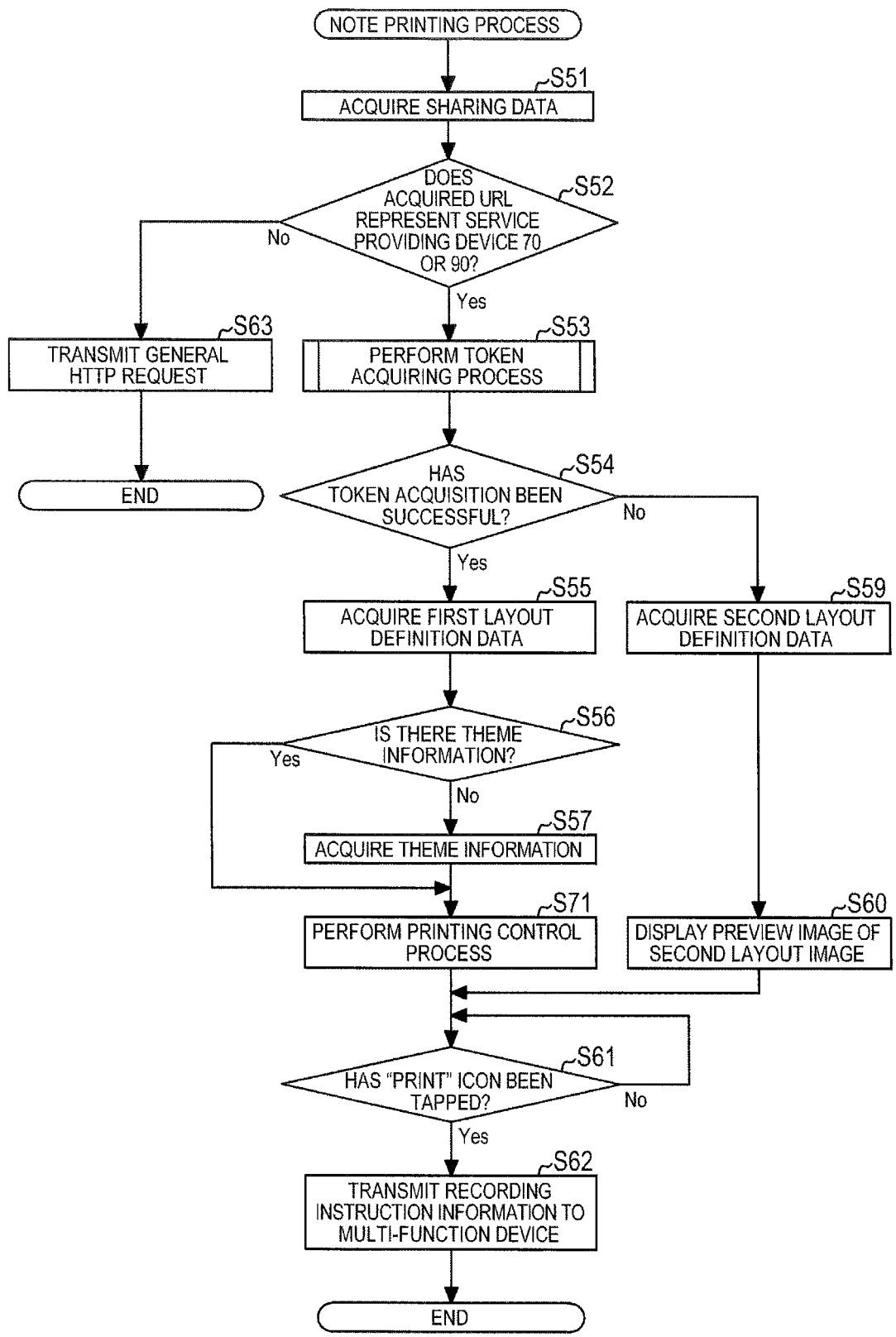
FIG. 17 is a flow chart of a note printing process according to a modification of the second embodiment.

The first and second embodiments can be combined. For example, as shown in FIG. 17, in the note printing process according to the second embodiment, in place of STEP S58, a printing control process (STEP S71) may be performed.

Figure 4:
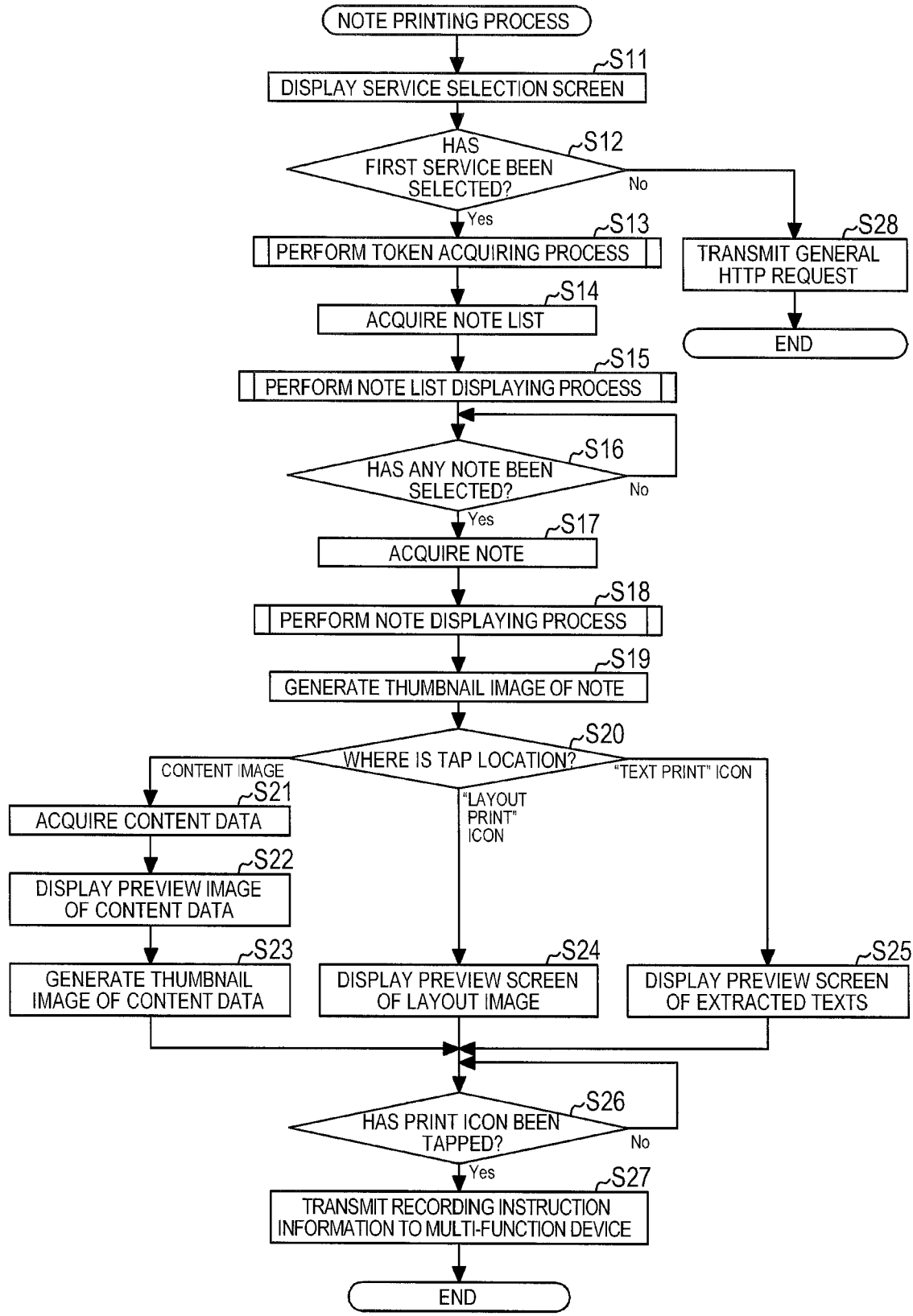
FIG. 4 is a flow chart of a note printing process of a first embodiment.

The printing control process correspond to the processes of STEPS S18 to S25 of FIG. 4, and thus will not be described again.

An example in which in a multi-function device 10 or the portable terminal 50 of the above described embodiment, the various programs stored in the program storage area 32A or 62A of the storage unit 32 or 62 are executed by the CPU 31 or 61, whereby each process of the control unit of the present disclosure is implemented has been described. However, the configuration of the control unit is limited thereto, and the whole or a part of the control unit may be implemented by hardware such as an IC (an abbreviation for Integrated Circuit) and the like.

Further, the aspect of the present disclosure can be implemented as the multi-function device 10 or the portable terminal 50, and can also be implemented as a program making the multi-function device 10 or the portable terminal 50 perform the processes. Furthermore, the corresponding program may be recorded in a non-transitory recording medium to be provided. The non-transitory recording medium may include a storage unit mounted on a server device which can be connected to the multi-function device 10 or the portable terminal 50 through the communication network 102, besides a CD-ROM, a DVD-ROM, or the like. Further, the program stored in the storage unit of the server device may be distributed as information or a signal representing the corresponding program, through the communication network 102 such as the Internet.

What is claimed is:

1. A terminal device comprising:
a display;
a user interface that receives touch operations on a display screen of the display; and
a processor configured to execute:
a layout displaying controlling process of controlling the display to display a layout screen in which a first content image icon indicating a first content defined by layout definition data and a second content image icon indicating a second content defined by the layout definition data are laid out as options subjected to an image recording,
the layout definition data defining a note and defining a layout of contents including the first content and the second content in the note,
the first content indicated by first content data,
the second content indicated by second content data,
the first content data being data in a first data format,
the second content data being data in a second data format that is different from the first data format,
the first data format associated with a first option value being an option value used for the image recording, and
the second data format associated with a second option value being an option value used for the image recording, the second option value being different from the first option value;
a touch operation receiving process of receiving a touch operation to a location of the first content image icon or a location of the second content image icon by the user interface to select the first content data or the second content data as a target of the image recording; and
a printing controlling process of,
in a case where the touch operation to the location of the first content image icon is received in the touch operation receiving process,
performing a control for printing the first content indicated by the selected first content data based on the first option value associated with the first data format being a data format of the selected first content data, and in a case where the touch operation to the location of the second content image icon is received in the touch operation receiving process, performing a control of printing the second content indicated by the selected second content data based on the second option value associated with the second data format being a data format of the selected second content data.

2. The terminal device according to claim 1, wherein the processor executes a preview displaying printing controlling process of, in a case where a first touch operation to the location of the first content image icon is received in the touch operation receiving process, performing a control for printing controlling the display to display a preview image for displaying the first content indicated by the selected first content data prior to the image recording based on the first option value associated with the first data format being a data format of the selected first content data, the preview image being an image based on the selected first content data and the first option value associated with the first data format being a data format of the selected first content data, wherein the image recording is executed based on the selected first content data, according to the first option value associated with the first data format being a data format of the selected first content data, in a case where a second touch operation for instructing the image recording is received by the user interface, and in a case where a third touch operation to the location of the second content image icon is received in the touch operation receiving process, performing a control of printing controlling the display to display a preview image for displaying the second content indicated by the selected second content data prior to the image recording based on the second option value associated with the second data format being a data format of the selected second content data, the preview image being an image based on the selected second content data and the second option value associated with the second data format being a data format of the selected second content data, wherein the image recording is executed based on the selected second content data, according to the second option value associated with the second data format being a data format of the selected second content data, in a case where the second touch operation for instructing the image recording is received by the user interface.

3. The terminal device according to claim 1, wherein in the layout displaying controlling process, the processor controls the display to display the layout screen in which the note defined by the layout definition data is in addition laid out, and in the touch operation receiving process, the user interface enables to receive a touch operation to a location of the note as an option subjected to the image recording.

4. The terminal device according to claim 2, wherein in the preview displaying controlling process, in a case where the touch operation to the location of the note as an option subjected to the image recording is received in the touch operation receiving process, the processor controls the display to display a preview image for displaying the note defined by the layout definition data prior to the image recording, the preview image being an image based on the note defined by the layout definition data and an option value associated with the note, wherein the image recording is executed based on the layout definition data, according to the option value associated with the note, in a case where the second touch operation for instructing the image recording is received by the user interface.

5. The terminal device according to claim 4, wherein in the preview displaying controlling process, the processor controls the display to display the preview image, the preview image representing an image recorded by the image recording to be performed in an image recording device in response to a user's operation to perform the image recording, the image recording records the layout screen according to a layout screen option value to be used for record the layout screen on a sheet by the image recording, the layout screen option value is stored in a storage unit.

6. The terminal device according to claim 1, wherein the first content image icon and the second content image icon laid out in the layout screen include at least one of a thumbnail image and a format image, the thumbnail image being represented by the first content data or the second content data, the format image being for identifying the first content data having the first data format or the second content data having the second data format.

7. The terminal device according to claim 6, wherein the format image includes an image for identifying the first data format or the second data format and an identification for identifying the first content data or the second content data.

8. The terminal device according to claim 6, wherein in the layout displaying controlling process, the processor determines whether the second content data having the second data format is unable to be processed by the image recording;

when it is determined that the second content data having the second data format is unable to be processed by the image recording, the processor generates a non-processable image representing that the second content data is unable to be processed by the image recording;

the processor displays the non-processable image and the identification information for identifying the second content data.

9. The terminal device according to claim 1, wherein the layout definition data includes text data and layout information representing a layout of a text represented by the text data, and in the layout displaying controlling process, the text is located at a location on the layout screen represented by the layout information.

10. The terminal device according to claim 2, wherein the layout definition data includes text data and layout information representing a layout of a text represented by the text data, in the layout displaying controlling process, the text is located at a location on the layout screen represented by the layout information, and in the preview displaying controlling process which is performed when an operation unit receives a user's operation for instructing output the text, the processor controls the display to display the preview image, the preview image represents an image recorded by the image recording to be performed in an image recording device, wherein in the image recording the text is recorded based on the text data according to a text option value to be used for record the text on the sheet by the image recording, wherein the text option value is stored in a storage unit.

11. The terminal device according to claim 2, wherein in the preview displaying controlling process which is performed when an operation unit receives a user's operation for selecting a plurality of content images to be included in the layout screen, the processor controls the display to display the preview image, the preview image representing an image recorded by the image recording to be performed in an image recording device, wherein in the image recording the image is recorded based on each of the plurality of selected content data according to the option value corresponding to the data format of each of the plurality of selected content data.

12. The terminal device according to claim 2,
wherein in the preview displaying controlling process,
in a case that the layout screen includes the first content image icon corresponding to the first content data having the first data format, the processor records the image generated based on the first content data having the first data format, and
in a case that the layout screen includes a third content image icon corresponding to third content data having a third data format different from the first data format and the second data format, the processor does not record an image generated based on the third content data having the third data format.

13. The terminal device according to claim 1, wherein the processor executes an authentication information acquiring process of acquiring authentication information representing that it is authorized to acquire data stored in a service providing server existing on the Internet, and
the processor receives the layout definition data from the service providing server through a network interface, which enables to communicate with the Internet, as a response to the authentication information transmitted to the service providing server through the network interface.

14. The terminal device according to claim 13,
wherein the processor executes:
a service selecting allowing process of allowing a user to select one of a plurality of service providing servers, as a layout definition data acquisition source, the plurality of service providing servers are configured to perform wireless communication with the terminal device; and
a selecting operation receiving process of receiving a user's operation for selecting a specific service providing server from the plurality of service providing servers,
when the user's operation for selecting the specific service providing server is received, the processor executes the authentication information acquiring process, in the authentication information acquiring process, the authentication information of the selected service providing server is acquired.

15. The terminal device according to claim 1,
wherein the processor executes an authentication information acquiring process of acquiring authentication information representing that it is authorized to acquire data stored in a service providing server existing on the Internet, and
the processor receives the content data from the service providing server through a network interface, which enables to communicate with the Internet, as a response to the authentication information transmitted to the service providing server through the network interface.

16. The terminal device according to claim 1,
wherein the first option value and the second option value include at least one of sheet type option value which defines a sheet type on which the image recording is performed and color option type which defines color characteristic of the image recording.

17. A non-transitory computer readable recording medium storing a computer readable instruction which can be executed by a computer which includes a display, and a user interface for receiving touch operations on a display screen of the display, the instruction when executed by the computer causes the computer to execute:
a layout displaying controlling process of controlling the display to display a layout screen in which a first content image icon indicating a first content defined by layout definition data and a second content image icon indicating a second content defined by the layout definition data are laid out as options subjected to an image recording,
the layout definition data defining a note and defining a layout of contents including the first content and the second content in the note,
the first content indicated by first content data,
the second content indicated by second content data,
the first content data being data in a first data format,
the second content data being data in a second data format that is different from the first data format,
the first data format associated with a first option value being an option value used for the image recording, and
the second data format associated with a second option value being an option value used for the image recording, the second option value being different from the first option value;
a touch operation receiving process of receiving a touch operation to a location of the first content image icon or a location of the second content image icon by the user interface to select the first content data or the second content data as a target of the image recording; and
a printing controlling process of,
in a case where the touch operation to the location of the first content image icon is received in the touch operation receiving process,
performing a control for printing the first content indicated by the selected first content data based on the first option value associated with the first data format being a data format of the selected first content data, and
in a case where the touch operation to the location of the second content image icon is received in the touch operation receiving process,
performing a control of printing the second content indicated by the selected second content data based on the second option value associated with the second data format being a data format of the selected second content data.

* * * * *